US006792133B2

(12) United States Patent
Ott et al.

(10) Patent No.: US 6,792,133 B2
(45) Date of Patent: Sep. 14, 2004

(54) AUTOMATIC BITONAL IMAGE OPTIMIZATION

(75) Inventors: Cindy D. Ott, Oakland, CA (US); D. Michael Ott, Oakland, CA (US); Frederick Crowhurst, Oakland, CA (US)

(73) Assignee: Picture Elements Incorporated, Berkeley, CA (US)

( * ) Notice: Subject to any disclaimer, the term of this patent is extended or adjusted under 35 U.S.C. 154(b) by 603 days.

(21) Appl. No.: 09/832,993

(22) Filed: Apr. 10, 2001

(65) Prior Publication Data

US 2003/0021447 A1 Jan. 30, 2003

(51) Int. Cl.⁷ .......................... G06K 9/00; G06K 9/40; G06K 5/00
(52) U.S. Cl. ...................... 382/112; 382/137; 382/254; 382/274; 345/617
(58) Field of Search ............................... 382/112, 137, 382/254, 274, 275, 270; 358/2.1, 2.99, 3.01; 345/617

(56) References Cited

U.S. PATENT DOCUMENTS

| | | | | | |
|---|---|---|---|---|---|
| 4,523,331 | A | * | 6/1985 | Asija | 382/192 |
| 4,853,970 | A | * | 8/1989 | Ott et al. | 382/266 |
| 5,600,732 | A | * | 2/1997 | Ott et al. | 382/112 |
| 6,215,469 | B1 | * | 4/2001 | Mori et al. | 345/691 |
| 6,226,400 | B1 | * | 5/2001 | Doll | 382/163 |
| 6,246,793 | B1 | * | 6/2001 | Rindtorff et al. | 382/174 |

FOREIGN PATENT DOCUMENTS

EP        1 104 916 A1 * 6/2001 ............. G06T/9/00

OTHER PUBLICATIONS

Kosheleva et al., "Compression Degradation Metrics for Analysis of Consistency in Microcalcification Detection," IEEE, 1998, pp. 35–40.*

Djeziri et al., "Extraction of Items From Checks," IEEE, 1997, pp. 749–752.*

Djeziri et al., "Extraction of Signature from Check Background Based on a Filiformity Criterion," IEEE, 1998, pp. 1425–1438.*

Sharpe, Lou, "OCR Improvement Through Use of Picture Elements Technology," Dec. 5, 1998, Picture Elements, Inc., pp. 1–3.*

* cited by examiner

Primary Examiner—Daniel Mariam
Assistant Examiner—Shefali Patel
(74) Attorney, Agent, or Firm—Elliot B. Aronson

(57) ABSTRACT

A method for processing a digital image of a document to provide one or more bitonal digital copies of selected image quality that are optimized for specific purposes. The method is suited for use with such documents as bank checks and commercial forms that have printed or handwritten textual characters overlaid on potentially obscuring backgrounds. The method may provide a clean bitonal digital copy with reduced background optimized for use in optical character recognition or an archival copy with meaningful background retained that is optimized for archiving the original document. A set of bitonal copies of the digital image of a document is derived covering a range of contrast sensitivities. The copies are compared and a numerical measure is provided representing the amount of change in going from one copy to the next. The collection of such numerical measures defines a numerical sequence representing variations in the digital image as the contrast sensitivity is monotonically varied. The image-variation sequence is automatically analyzed to find the region or regions of rapid dropoff, generally signifying that certain unwanted or wanted features of the image are dropping out, and to find regions of more gradual changes. Optimizing values of the contrast sensitivities are selected to fall in select positions with respect to the peak or peaks and tails that are found in the sequence. The optimizing contrast sensitivities are used to generate one or more optimized bitonal digital copies such as a clean image or an archival image.

7 Claims, 22 Drawing Sheets

FIG. 2A

|  | 522045 | 339778 | 3 | 3 | *** |

0 9 3 3 0 3 1 3

SOLD TO

BISHOP CA

SHIP TO

WILL CALL
WILL CALL

| TERMS | CUSTOMER P.O. NO. AND DATE |
|---|---|
| CSH | ATTN=LUCKY |

| # | SLOT NO. | ORDER QTY | CHK | SHIP QTY | UNIT OF MEASURE |
|---|---|---|---|---|---|
| 1 | 17-36-32 | 2 | | 2 | CS 10LB |
| 2 | | | | | |
| 3 | 17-50-22 | 1 | | 1 | CSE 4/4LB |
| 4 | | | | | |
| 5 | 17-85-22 | 2 | | 2 | CSE 6/4LB |
| 6 | | | | | |
| 7 | 18-22-12 | 1 | | 1 | CS 10LB |
| 8 | | | | | |
| 9 | 19-56-31 | 1 | | 1 | CS 20LB |
| 10 | | | | | |
| 11 | 20-21-12 | 3 | | 3 | CS 10LB |
| 12 | | | | | |
| 13 | 25-26-00 | 1 | | 1 | CSE 6/6LB |
| 14 | | | | | |
| 15 | 31-19-11 | 1 | | 1 | BX 30LB |
| 16 | | | | | |
| 17 | 32-11-12 | 2 | | 2 | CW/CS 20#/ TOTAL WEIG |
| 18 | | | | | |
| 19 | 34-31-21 | 2 | | 2 | CSE 4/5LB |
| 20 | | | | | |
| 21 | 34-34-21 | 8 | | 8 | CW/CS39#/1 TOTAL WEIG |
| 22 | | | | | |

| ASSEMBLER | PIECE COUNT | TOTALS | FOOD ITEMS | NON |
|---|---|---|---|---|
| ELIVERED BY | | Lm | RETURNS AS DESCRIBED E | |
| ECEIVED IN GOOD RDER BY | | | | |
| HECKED BY | STOP NO. | | | |
| | | | ACCOUNTING | NO |

SOLD TO

BISHOP CA

SHIP TO

WILL CALL
WILL CALL

| TERMS | CUSTOMER P.O. NO. AND DATE | | | |
|---|---|---|---|---|
| CSH | ATTN:LUCKY | | | |
| SLOT NO. | ORDER QTY | CHK | SHIP QTY | UNIT OF MEASURE |
| 1  17-36-32 | 2 | | 2 | CS 10LB |
| 2 | | | | |
| 3  17-50-22 | 1 | | 1 | CSE 4/4LB |
| 4 | | | | |
| 5  17-85-22 | 2 | | 2 | CSE 6/4LB |
| 6 | | | | |
| 7  18-22-12 | 1 | | 1 | CS 10LB |
| 8 | | | | |
| 9  19-56-31 | 1 | | 1 | CS 20LB |
| 10 | | | | |
| 11 20-21-12 | 3 | | 3 | CS 10LB |
| 12 | | | | |
| 13 25-26-00 | 1 | | 1 | CSE 6/6LB |
| 14 | | | | |
| 15 31-19-11 | 1 | | 1 | BX 30LB |
| 16 | | | | |
| 17 32-11-12 | 2 | | 2 | CW/CS 20#/ TOTAL WEIG( |
| 18 | | | | |
| 19 34-31-21 | 2 | | 2 | CSE 4/5LB |
| 20 | | | | |
| 21 34-34-21 | 8 | | 8 | CW/CS39#/1 TOTAL WEIG |
| 22 | | | | |

ASSEMBLER | PIECE COUNT | TOTALS | FOOD ITEMS | NON
DELIVERED BY | | Lm | RETURNS AS DESCRIBED E |
RECEIVED IN GOOD ORDER BY | | | |
CHECKED BY | STOP NO. | | |

ACCOUNTING

FIG. 2C

| | 522045 | 339778 | 3 | 3 | *** |

SOLD TO: BISHOP CA

SHIP TO: WILL CALL / WILL CALL

| TERMS | CUSTOMER P.O. NO. AND DATE |
|---|---|
| CSH | ATTN:LUCKY |

| | SLOT NO. | ORDER QTY | CHK | SHIP QTY | UNIT OF MEASURE |
|---|---|---|---|---|---|
| 1 | 17-36-32 | 2 | ✓ | 2 | CS 10LB |
| 3 | 17-50-22 | 1 | ✓ | 1 | CSE 4/4LB |
| 5 | 17-85-22 | 2 | ✓ | 2 | CSE 6/4LB |
| 7 | 18-22-12 | 1 | ✓ | 1 | CS 10LB |
| 9 | 19-56-31 | 1 | ✓ | 1 | CS 20LB |
| 11 | 20-21-12 | 3 | ✓ | 3 | CS 10LB |
| 13 | 25-26-00 | 1 | ✓ | 1 | CSE 6/6LB |
| 15 | 31-19-11 | 1 | ✓ | 1 | BX 30LB |
| 17 | 32-11-12 | 2 | ✓ | 2 | CH/CS 20#/ TOTAL WEIG |
| 19 | 34-31-21 | 2 | ✓ | 2 | CSE 4/5LB |
| 21 | 34-34-21 | 8 | ✓ | 8 | CH/CS39#/1 TOTAL WEIG |

| ASSEMBLER | PIECE COUNT | TOTALS | FOOD ITEMS | NON |
|---|---|---|---|---|
| DELIVERED BY | | Lm | RETURNS AS DESCRIBED B | |
| RECEIVED IN GOOD ORDER BY | | | | |
| CHECKED BY | STOP NO | | | |
| | | | ACCOUNTING | NO |

SOLD TO

BISHOP CA

SHIP TO

WILL CALL
WILL CALL

| TERMS | CUSTOMER P.O. NO. AND DATE | | | |
|---|---|---|---|---|
| CSH | ATTN:LUCKY | | | |
| SLOT NO. | ORDER QTY | CHK | SHIP QTY | UNIT OF MEASURE |
| 1  17-36-32 | 2 | ✓ | 2 | CS 10LB |
| 3  17-50-22 | 1 | ✓ | 1 | CSE 4/4LB |
| 5  17-85-22 | 2 | ✓ | 2 | CSE 6/4LB |
| 7  18-22-12 | 1 | ✓ | 1 | CS 10LB |
| 9  19-56-31 | 1 | ✓ | 1 | CS 20LB |
| 11 20-21-12 | 3 | ✓ | 3 | CS 10LB |
| 13 25-26-00 | 1 | ✓ | 1 | CSE 6/6LB |
| 15 31-19-11 | 1 | ✓ | 1 | BX 30LB |
| 17 32-11-12 | 2 | ✓ | 2 | CW/CS 20#/ TOTAL WEIG |
| 19 34-31-21 | 2 | ✓ | 2 | CSE 4/5LB |
| 21 34-34-21 | 8 | ✓ | 8 | CW/CS39#/1 TOTAL WEIG |

ASSEMBLER | PIECE COUNT | TOTALS | FOOD ITEMS | NON

DELIVERED BY          Lm        RETURNS AS DESCRIBED E

RECEIVED IN GOOD ORDER BY

CHECKED BY | STOP NO

ACCOUNTING

*FIG. 2E*

|  | 522045 | 339778 | 3 | 3 | *** |

SOLD TO
BISHOP CA

SHIP TO
WILL CALL
WILL CALL

| TERMS | CUSTOMER PO NO AND DATE |
|---|---|
| CSH | ATTN:LUCKY |

| | SLOT NO. | ORDER QTY | CHK ✓ | SHIP QTY | UNIT OF MEASURE |
|---|---|---|---|---|---|
| 1 2 | 17-36-32 | 2 | | 2 | CS 10LB |
| 3 4 | 17-50-22 | 1 | | 1 | CSE 4/4LB |
| 5 6 | 17-85-22 | 2 | | 2 | CSE 6/4LB |
| 7 8 | 18-22-12 | 1 | | 1 | CS 10LB |
| 9 10 | 19-56-31 | 1 | | 1 | CS 20LB |
| 11 12 | 20-21-12 | 3 | | 3 | CS 10LB |
| 13 14 | 25-26-00 | 1 | | 1 | CSE 6/6LB |
| 15 16 | 31-19-11 | 1 | | 1 | BY 30LB |
| 17 18 | 32-11-12 | 2 | | 2 | CN/CS 20#/ TOTAL WEIG |
| 19 20 | 34-31-21 | 2 | | 2 | CSE 4/5LB |
| 21 22 | 34-34-21 | 8 | | 8 | CN/CS39#/1 TOTAL WEIG |

| ASSEMBLER | PIECE COUNT | TOTALS | FOOD ITEMS | NON |
|---|---|---|---|---|
| DELIVERED BY | | Lm | RETURNS AS DESCRIBED | |
| RECEIVED IN GOOD ORDER BY | | | | |
| CHECKED BY | STOP NO | | | |
| | | | | NO |

AUTOMATIC BITONAL IMAGE OPTIMIZATION

BACKGROUND OF THE INVENTION

The present invention relates generally to the electronic processing of images and is more particularly directed to the processing of document images that may include printed or handwritten text overlying background markings such as graphics, decorative or security patterns, or distracting blemishes.

In many document-processing applications the images of the documents to be processed are electronically captured and presented to operators at workstations for data entry or are subjected to automatic processing, such as optical character recognition, directly from the electronic images. The images may be archived on magnetic or optical media and subsequently retrieved and displayed or printed when needed. Such systems are used to process and archive a wide range of document types such as bank checks, credit card receipts and remittance documents as well as commercial documents such as purchase order forms and invoice forms.

Checks, for example, are processed in high volumes by capturing the images of the front and back sides of the checks on high-speed document transports. The images are then displayed at workstations where operators may enter the dollar amounts, verify signatures, reconcile inconsistencies and undertake other processing steps. Many financial institutions will then provide their account holders printouts showing small-scale black and white printed images of recently processed checks with the monthly account statements.

A problem arises in working with such digital images of checks or other documents. On a typical check the various data fields to be filled in with substantive information, such as payee, date, dollar amount, and authorizing signature of the payor, generally overlie a background picture or security pattern. Even form documents such as order forms may include fields with gray backgrounds to be filled in or may include hand stamps with a received date or sequence number which may be uneven in appearance or which may have inadvertently been placed over other markings, for example. In the digitally captured image of such checks or forms the substantive data fields are sometimes difficult to read because of interference from the digitally captured background image or pattern or even from paper blemishes, creases or obscuring smudges. Reduced-scale printouts of such images may be even harder to read.

Early systems for image processing of bank checks tried to eliminate the background picture or pattern altogether from the captured image of the check. Such early systems typically employed a thresholding technique to eliminate the background. Such techniques have not been entirely successful. They tend to leave behind residual black marks left over from the background image that interfere with the substantive information on the check and in some instances may even degrade the handwritten or printed textual matter on the check making it more difficult to read. In addition, it is sometimes desirable to retain some or all of the background picture, for example, to provide an archival copy of the original document. The problem here is that an insensitive threshold may avoid most, although generally not all, of the background but may miss some of the low-contrast text, whereas a more sensitive threshold may pick up most of the low-contrast text but more of the obscuring background, too.

Over the years various other approaches have been developed for handling background graphics in document images and either eliminating the background or reproducing it in a more readable fashion. Such other approaches may be seen for example in U.S. Pat. Nos. 4,853,970 and 5,600,732. See also the recent publication by S. Djeziri et al., entitled "Extraction of Signatures from Check Background Based on a Filiformity Criterion," IEEE Transactions on Image Processing, Vol. 7, No. 10, October 1998, pp. 1425–1438, and references cited therein for general discussions of the field.

In particular, U.S. Pat. No. 4,853,970 discloses an approach in which the captured image of a document is first analyzed to find the edges of pictorial or text features present in the image. The edges separate other areas of light and dark over which the intensity varies more gradually, if at all. The image is then reconstructed by separately reconstructing the edges with an algorithm, referred to in U.S. Pat. No. 4,853,970 as a point algorithm or point operator, that is adapted to give good representation of the image where edges are located and reconstructing the expanses of gradual intensity variation with an algorithm, referred to in U.S. Pat. No. 4,853,970 as a level algorithm or level operator, that is appropriate for such gradual variations. For example, a thresholding algorithm with very insensitive threshold could be used for the second algorithm if it is desired to minimize the background or a digital half-toning algorithm could be used to give a good representation of pictorial graphics without compromising the textual matter, which is composed primarily of characters that have strong edges.

Notwithstanding the benefits of this method, it may nevertheless represent a compromise in the clarity and readability of the original document

SUMMARY OF THE INVENTION

The present invention provides a method for processing a digital image of a document to provide one or more bitonal digital copies of selected image quality that are optimized for specific purposes. The method is especially suited for image processing of such documents as bank checks and commercial forms that tend to have printed or handwritten textual characters overlaid on a wide variety of potentially obscuring background markings, security patterns or decorative pictures as well as paper blemishes. The method may provide a so-called clean bitonal digital copy, for example, that is optimized for use in optical character recognition where it is desired to reduce as much as possible the obscuring influences of the background, or a so-called archival copy that is optimized for archiving the original document, where it is desired to retain meaningful background along with the text but eliminate background "noise."

Briefly, a digital image of a document is processed in accord with the invention by deriving a set of bitonal copies of the digital image covering a range of contrast sensitivities. At least three bitonal copies are required although in general it will be desirable to use more than three. The copies are compared pairwise and for each pair a numerical measure is provided representing the difference between the two copies making up the pair. The copies are compared in the order of their respective contrast sensitivities. That is, the copies in each pairwise comparison correspond to adjacent contrast sensitivities when the contrast sensitivities are arranged monotonically to form, for example, a decreasing sequence. The collection of such numerical measures defines a numerical sequence, referred to herein as the image-variation sequence, representing variations in the digital image as the contrast sensitivity is decreased. The numerical image-variation sequence is then analyzed according to prescribed criteria to derive one or more optimizing contrast sensitivities, which are then used to generate one or more optimized bitonal digital copies of the digital image at the optimizing contrast sensitivities.

The image-variation measure quantifying the change from one bitonal copy to the next may take a variety of forms. In one embodiment it is determined from a pixel-by-pixel comparison of two bitonal images. The measure of the change here is taken simply as the number of pixels at which the two images differ. This simple measure is desirable in that it is simple to implement and it gives surprisingly good results over a wide range of document types. Other measures may also be employed that may be adapted to particular kinds of documents or have other beneficial characteristics in certain applications. Another embodiment of such a measure is based on an analysis of the pattern of black and white pixels in a local neighborhood of each pixel in the image under examination. A numerical measure is derived from the differences in the frequency of occurrence of certain neighborhood patterns between the two bitonal images under comparison.

The image-variation sequence is automatically analyzed to find the region or regions of rapid dropoff, generally signifying that certain unwanted or wanted features of the image are dropping out, and to find regions of more gradual changes. These regions may be visualized as a downward slope from a peak and a gradually decreasing tail if the sequence is plotted on a graph. The optimizing values of the contrast sensitivities are selected to fall in select positions with respect to the peak or peaks and tails that are found in the sequence.

It is an advantage of the present method that it is simple to implement. It is a further advantage that it may be used as a supplement to other document image processing methods to fine-tune the results.

Other aspects, advantages, and novel features of the invention are described below or will be readily apparent to those skilled in the art from the following specifications and drawings of illustrative embodiments.

BRIEF DESCRIPTION OF THE DRAWINGS

FIGS. 2A–2G show representative bitonal images of a sample document at a sequence of decreasing contrast sensitivities.

DETAILED DESCRIPTION OF ILLUSTRATIVE EMBODIMENTS

Figure 1:
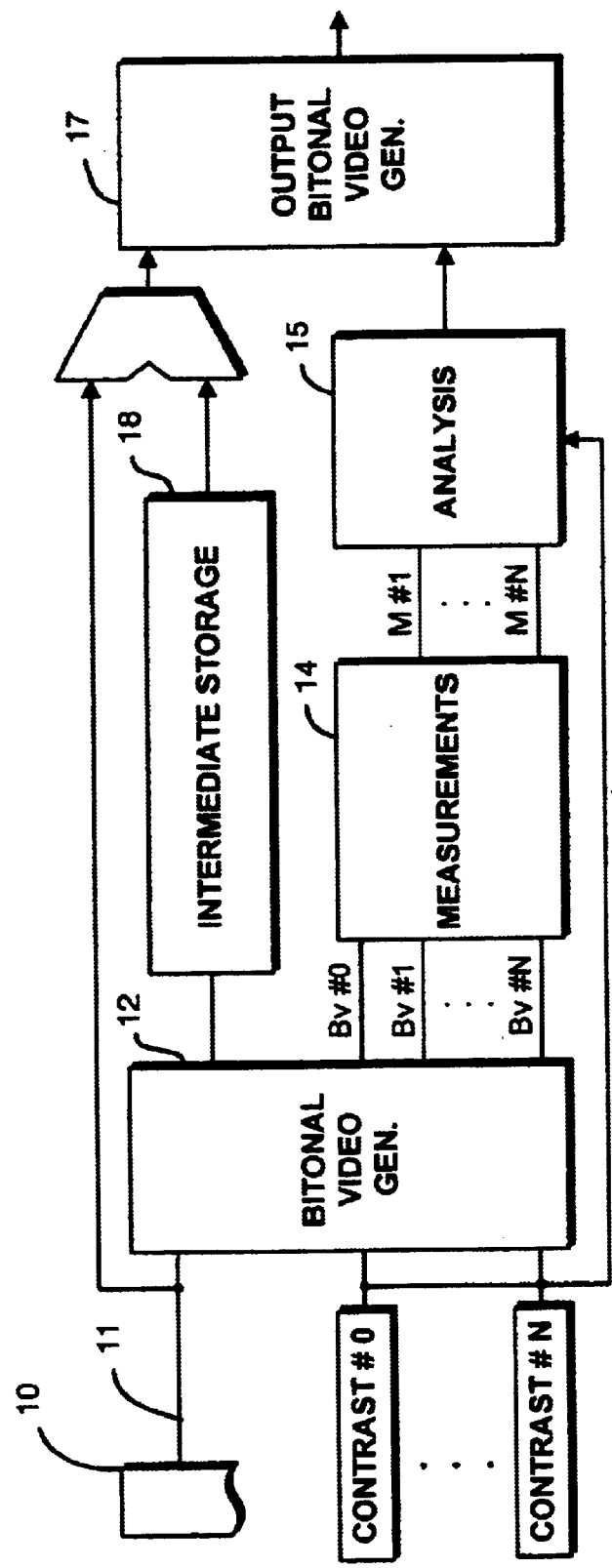
FIG. 1 is a high-level block diagram of representative apparatus for processing a digital image according to the invention.

An introductory overview of an embodiment of the invention is described with reference to FIG. 1. A digital image of a document 10 to be processed is presented along line 11 to a binary video generator 12 for producing a bitonal image from the applied digital image. The binary video generator of FIG. 1 produces a set of N+1 bitonal copies of the applied digital image, each copy being made at a distinct contrast sensitivity. At least three digital copies are needed. In the examples discussed below N is taken to be sixteen, i.e., seventeen digital copies are generated at seventeen different contrast sensitivity settings. The resultant N+1 copies are provided on lines Bv #0, . . . , Bv #N to a measurement unit 14, which makes pairwise comparisons of the various copies and determines a numerical measure of the change between the two copies in each pair. Measurement unit 14 compares two copies that have adjacent contrast sensitivities when the sequence of distinct contrast sensitivities are arranged in monotonic order, that is to say, either increasing or decreasing order. The collection of such pairwise numerical measures defines a numerical sequence, referred to herein as the image-variation sequence, representing variations in the digital image as the contrast sensitivity is monotonically varied. The numerical measures comprising the image-variation sequence are applied to an analysis unit 15 along lines M #1, . . . , M #N. Analysis unit 15 examines the numerical image-variation sequence and the corresponding input contrast sensitivities and derives from them one or more values according to prescribed criteria, which values will serve as contrast sensitivities and are referred to herein as optimizing contrast sensitivities. The derived optimizing contrast sensitivities may turn out to be different from any of the input contrast sensitivities, although in any particular case a derived optimizing contrast sensitivity may happen to equal an input contrast sensitivity. The derived optimizing contrast sensitivities are then applied to output binary video generator 17, which generates corresponding optimized bitonal digital copies of the digital image at the optimizing contrast sensitivities. Block 18 stores image data for use in generating the output bitonal copies. It may be used for example to store source digital video data or intermediate bitonal image results or generated bitonal image data.

The overall scheme of FIG. 1 may be implemented in a number ways and lies well within the ordinary skill of the practitioner in the art, who will readily be able to extract and direct binary video data streams to the measurement and analysis units at appropriate times for processing in accord with the methods of the invention. The detailed implementation of the analysis block is embodied in software, representative source code for which is included herein in Appendix A in the C Language.

Reference is now made to FIGS. 2A–2G, which show a representative selection of bitonal digital copies of a digital image of document. Strictly speaking, "bitonal copy" refers to an electronic digital representation. For purposes of illustration, however, FIGS. 2A–2G show printouts of the digital copies.

A printout and the electronic digital representation from which the printout was made are both referred to herein as bitonal copies, and it will be clear from the context which one is meant.

The copies depicted in FIGS. 2A–2G are derived from a commercial order form which displays a variety of visual features that may be captured with varying amounts of clarity in a digital representation, including for example regions of half-toned shading as background for some of the data fields, dot-matrix printing, some stamped numbers and handwritten check marks. For purposes of illustration FIGS. 2A–2G show only the left side of this form.

Figure 2A:
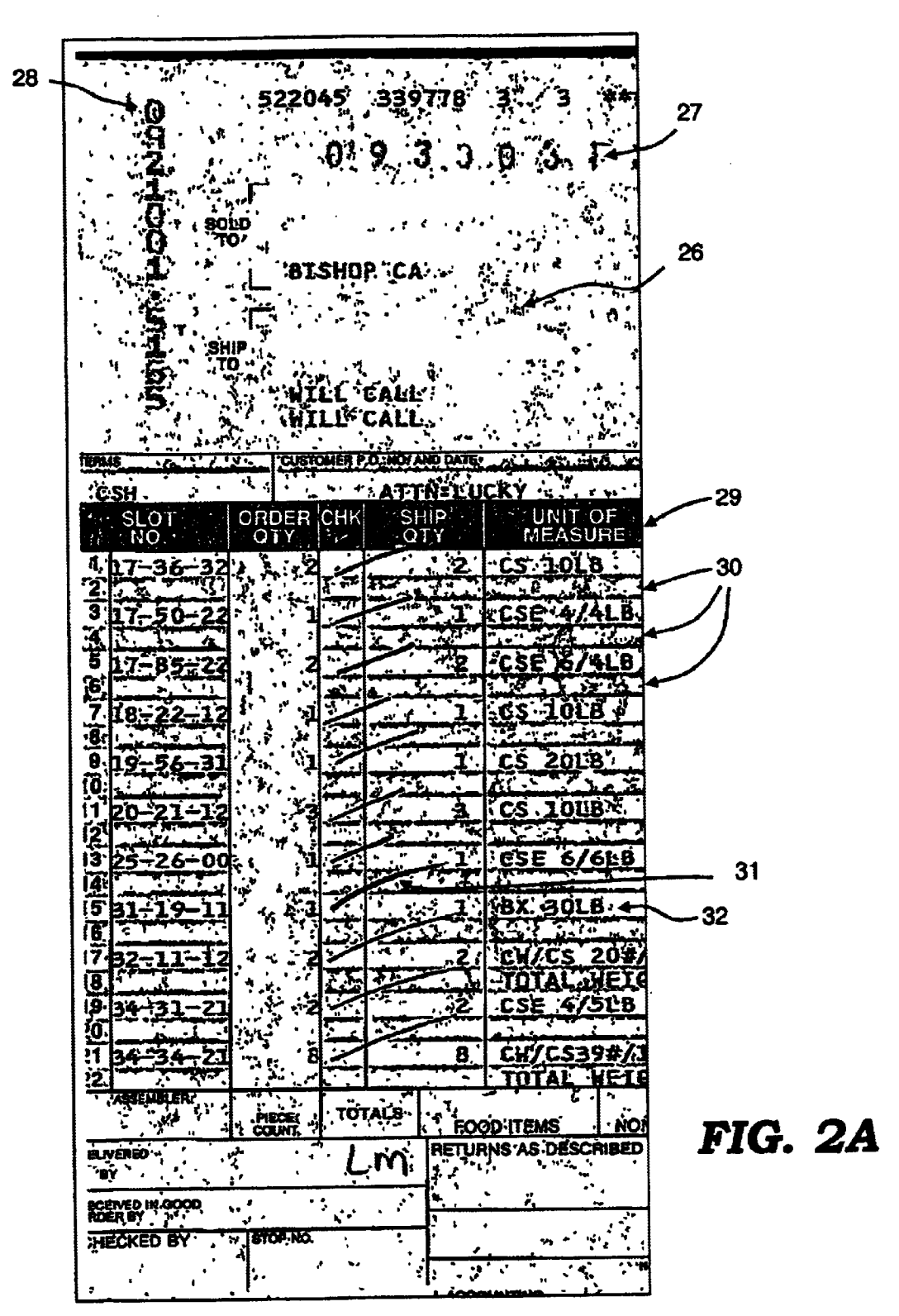
Figure 2G:
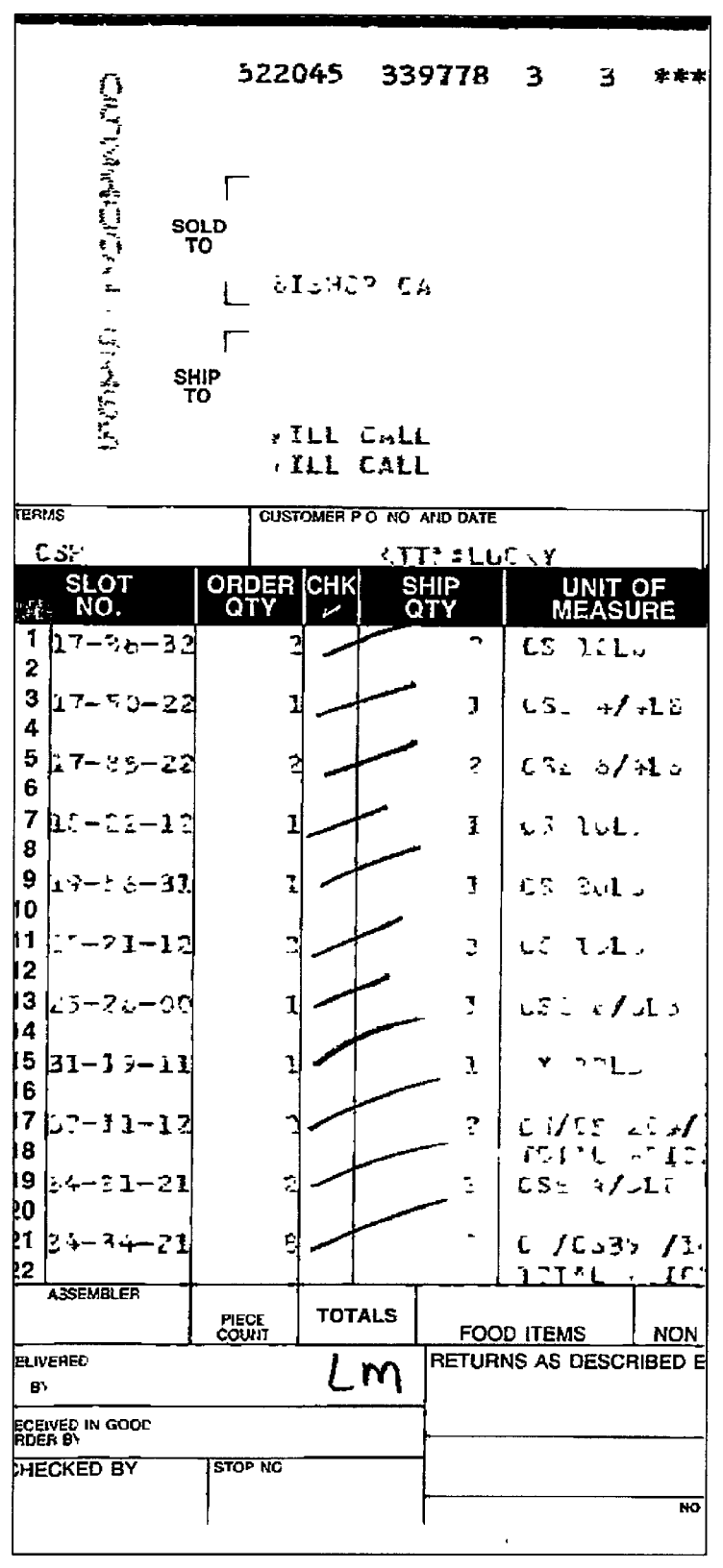

FIG. 2A was produced with a high contrast sensitivity, meaning that very slight changes in contrast will be distinguished in the bitonal copy and will show up in the digital representation. The representation of FIG. 2A made with a high sensitivity to contrast is quite dirty. The region at the top of the form indicated by reference numeral 26 is punctuated with black marks due primarily to irregularities and discolorations in the paper. A stamped number is seen at 27. A coarse dot-matrix number is seen at 28. Fields with black backgrounds are seen with splotchy white marks at 29 and fields which in the original document have alternating gray backgrounds appear in the bitonal copy as covered with black marks at 30. Handwritten check marks are seen at 31. Conventional dot matrix printing may be seen at 32. As the contrast sensitivity is decreased, a greater change in contrast must be exhibited in a local area for that change to show up in the bitonal copy. FIG. 2B shows a copy made at somewhat reduced contrast sensitivity. Much of the dirty background has disappeared from the top region 26 in this copy. Many of the lower fields, however, still contain black marks that have no information content and that are potentially obfuscating to an automatic recognition process such as optical character recognition. As the contrast sensitivity is decreased further, it is seen that more background material drops out. For an intermediate range of contrast sensitivity a so-called Clean Image is produced in which much of the obscuring background is removed while the substantive text remains readable. In fact in the Clean Image the substantive text often becomes more readable as interference from background marks drops away. For low contrast sensitivities (i.e., only big variations in contrast in a localized region will be detected), the text also begins to drop out. In FIG. 2F for example the stamped number (at reference numeral 27 in FIG. 2A) has disappeared entirely, and in FIG. 2G much of the typed text has become unrecognizable.

The sequence of bitonal images shown in FIGS. 2A–2G exhibits a common pattern of variation. As the contrast sensitivity is decreased, low-contrast background features are the first to drop out. These typically include small, low-contrast speckles and sometimes low-contrast line segments, which are due typically to characteristics of the paper or sometimes to faint security backgrounds such as found on checks. Even differences in brightness of the paper fibers can be picked up in low-contrast copies such as at 26 in FIG. 2A. As the contrast sensitivity is decreased further, larger background features start to drop out. For example, decorative background pictures on checks start to drop away. For an intermediate range of contrast sensitivities textual material will generally be little affected while the background material falls away as seen in FIGS. 2B–2E where 26, 29 and 30 drip away while 32 remains unchanged. As the contrast sensitivity decreases even further, eventually even the text will begin to drop off. It has been observed in the present invention that the pattern of variation as various features in the digital image drop out will be exhibited to great extent in the numerical image-variation sequence that is measured in measurement unit 14. By analyzing the variations in the image-variation sequence—the manner in which it rises and falls as the contrast sensitivity is varied—an optimizing contrast sensitivity can be defined that will generate a bitonal copy having desired characteristics for an intended use. For example, two optimized bitonal copies that may be generated are a Clean Image, already mentioned, that is suitable for use, for example, in automatic character recognition or automatic mark sensing and a so-called Dark Image that includes more of the background material and may typically be used for archival purposes or for direct viewing in those instances when automatic character recognition on the Clean Image fails to recognize a character.

Figure 3A:
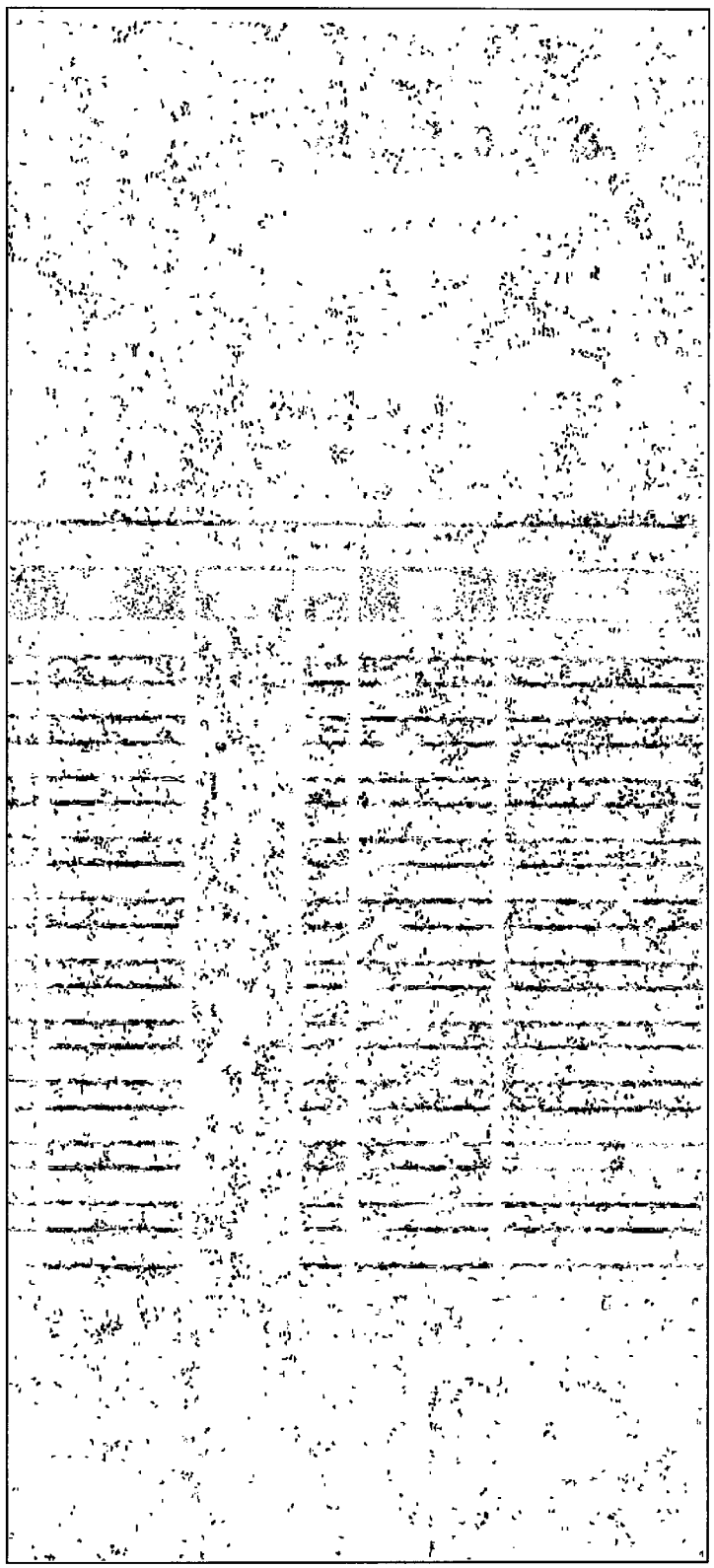
FIGS. 3A and 3B show representative difference images resulting from comparison of the bitonal images of FIGS. 2A, 2B and FIGS. 2D, 2E, respectively, using a pointwise difference measure.
Figure 3B:
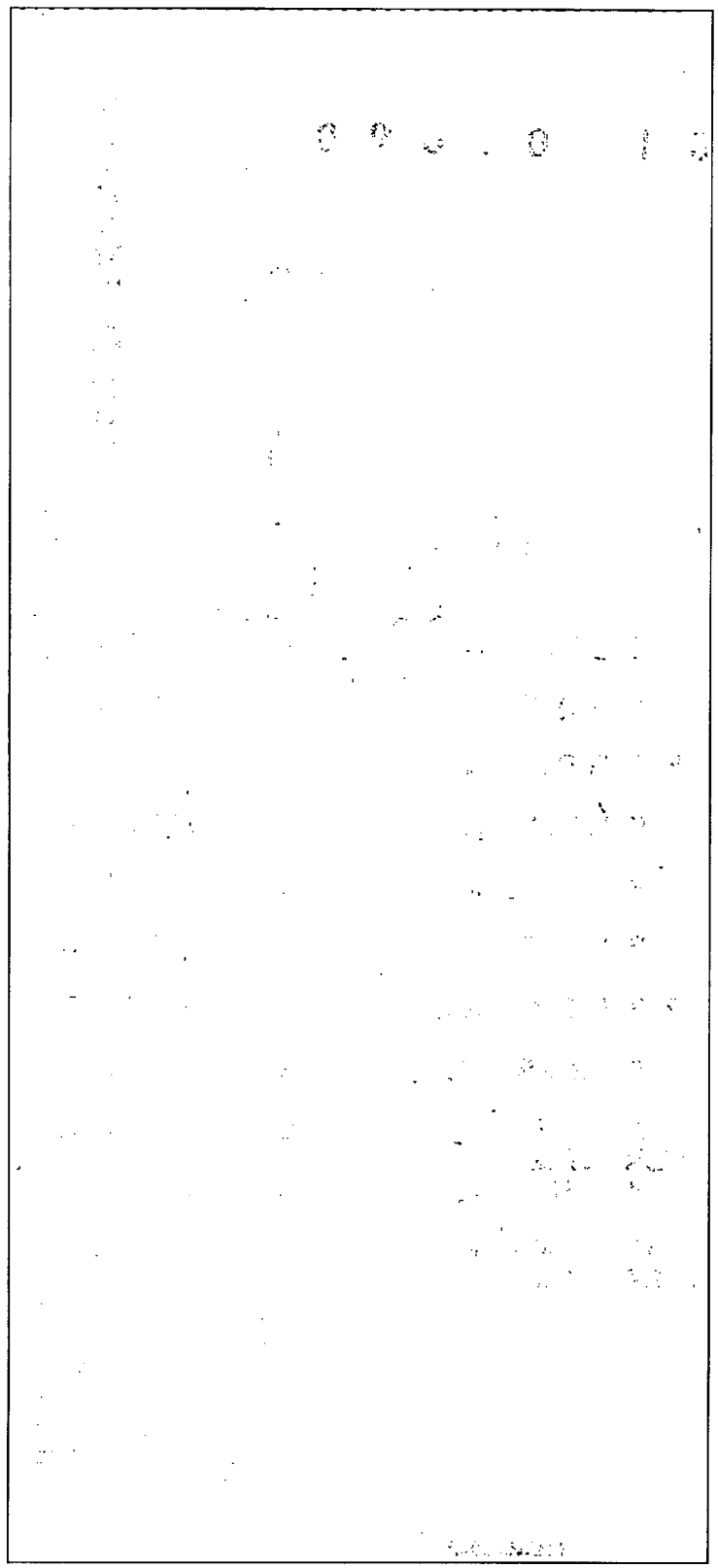
Figure 4A:
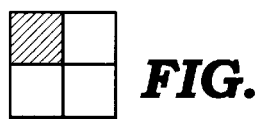
FIGS. 4A–4J show a number of 2×2 neighborhoods of a representative pixel for use in an alternative image-variation measurement method.
Figure 4C:
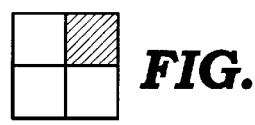
Figure 4B:
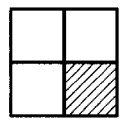
Figure 4D:
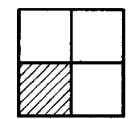
Figure 4E:
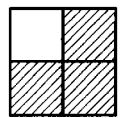
Figure 4G:
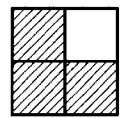
Figure 4F:
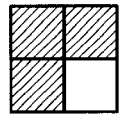
Figure 4H:
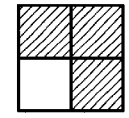
Figure 4I:
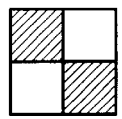
Figure 4J:
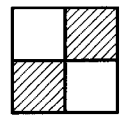

We turn now to the numerical measure of pairwise changes in the bitonal copies. For the broad purposes of the invention a numerical measure is needed that reflects in some sense the magnitude of change between the two bitonal copies under comparison. The precise nature of the measure employed is not important to the broad aspects of the invention although particular measures may offer advantages in certain applications or favorable compromises in implementation. For example, a measure that has been found to give good results over a wide range of documents and that is simple to implement is referred to herein as a pointwise difference measure. In the pointwise difference measure the two bitonal copies under comparison are simply subtracted pixel by pixel to produce a difference image that distinguishes only those pixels that have changed in going from one copy to the other. For example, the difference image may exhibit a black pixel where a change has occurred and a white pixel where no change has occurred. The numerical measure is then taken to be the number of black pixels in the difference image. By way of illustration FIGS. 3A and 3B show difference images resulting from comparison of the pairs FIGS. 2A, 2B and FIGS. 2D, 2E, respectively. The numerical measure of the change in going from FIGS. 2A to 2B or from FIGS. 2D to 2E is the number of black pixels in FIG. 3A or 3B, respectively. FIG. 3A illustrates the nature of the features that drop out in going from FIGS. 2A to 2B. The background pixels from the region 26 are evident as are the background pixels from the fields 29 and 30. In FIG. 3B the disappearance of the stamped number 27 is evident. The large number of black pixels in FIG. 3A represents are large numerical measure of the change in going from FIGS. 2A to 2B. This agrees with the general subjective impression that a big improvement in image quality has taken place in going from FIGS. 2A to 2B.

The pointwise difference measure is only one example of a numerical measure of the changes in going from one bitonal copy to another. Other measures may also be used that may provide improved results for particular kinds of documents. Alternative types of measures may be based for example on a local analysis of a neighborhood of each pixel. For each pixel a neighborhood of characteristic size or composition is examined to determine the value of a specified parameter. The parameter is then summed for all pixels and in some cases normalized to provide an overall measure for the digital copy. Changes between pairs of digital copies are then measured by the difference in the overall parameter values.

An example of this type of measure is based on 2×2 neighborhoods of each pixel and is illustrated with reference to FIGS. 4A–4J. A square of 4 pixels constitutes a 2×2 neighborhood of each pixel making up the square. A 2×2 neighborhood may be populated with black and white pixels in a total of sixteen different patterns. The ten patterns shown in FIGS. 4A–4J all define one or two differently colored corners. The corners are the isolated black pixels of FIGS. 4A–4D, the isolated white pixels of FIGS. 4E–4H, and each of the pixels of the checkerboard patterns of FIGS. 4I, 4J. The remaining six patterns (all black, all white, and 2 side-by-side pixels of the same color) do not define differently colored corner patterns.

It turns out that the 2×2 pixel patterns of FIGS. 4A–4J may be used to construct a useful measure for distinguishing the changes in bitonal images as the contrast sensitivity is changed. The patterns of FIGS. 4A–4D are referred to as outside corner patterns. The patterns of FIGS. 4E–4H are referred to as inside corner patterns. The two checkerboard patterns each exhibit 2 outside corners and 2 inside corners. The measure is constructed by successively examining all 2×2 neighborhoods making up the image under examination and counting the total number of outside corners and the total number of inside corners encountered. Each of the neighborhood patterns of FIGS. 4A–4H counts for one corner of the respective type and each of the neighborhood patterns of FIGS. 4I, 4J counts for two inside corners and for two outside corners. At the outside borders of the digital image a one-pixel wide border of white pixels is appended so that every pixel of the image will appear in exactly four neighborhoods. Let CO be the total number of outside corners, CI be the total number of inside corners, and B be the total number of black pixels in the image under consideration. Three measures that have been found of use in distinguishing changes are the quantities CO-CI, CO/B, and CI/B.

In general, the invention requires a numerical measure of the change from one bitonal copy to the next. In the broadest aspect of the invention how one arrives at such a measure is not important. So, for example, difference images between pairs of bitonal copies may be generated as a first step, or the individual difference images may be generated as needed. Certain image-variation measures may be defined in such a way that it makes sense to apply them to the bitonal image copies themselves and not just to the difference between bitonal copies. Some such measures permit an image-contrast difference measure to be generated, for example, by simply subtracting the measures of the two copies rather than generating a difference image first. All such configurations and permutations fall within the broad aspects of the invention. The important point is that the resulting numerical quantity provide a measure of the change in going from one bitonal copy to the next, and the order in which the steps are applied to get there is not important. In any given application some measures may be more beneficial than others because they are easier or less costly to implement or because they run faster. But all such implementations regardless of the order in which the steps are carried out fall within the broad aspect of the invention.

Having discussed the image-variation measure in going from one bitonal copy to another, we turn now to the contrast sensitivity parameter associated with the various bitonal copies. The contrast sensitivity parameter may be any parameter that controls, in whole or in part, the sensitivity of the method that is used to derive the bitonal image. For example, if a simple thresholding technique is used to derive the bitonal image, then the value of the threshold can serve as the contrast sensitivity parameter. The precise nature of the contrast sensitivity parameter is not important to the broad aspects of the invention so long as the parameter reflects in some way the sensitivity with which the technique for deriving bitonal images depends on the difference between light and dark areas in an image. Typically the contrast sensitivity parameter will represent a change in a threshold value that is adjusted in deriving the multiple bitonal copies. This great generality in the nature of the contrast sensitivity parameter permits the present method to be used with a great variety of techniques for deriving bitonal images. The method may be used as an adjunct to an existing method of deriving bitonal images to generate a "fine-tuned" bitonal image even with techniques that are already known to work well.

In the detailed examples discussed below, the bitonal images were derived using the general approach of U.S. Pat. No. 4,853,970, which was mentioned in the Background section of this specification. In this approach the captured image of a document is first analyzed to separate out the edges of pictorial or textual features such as the edges of a text character or the edges of shadows or features in a picture or graphic design. An edge is a transition region in which the image undergoes a rapid variation between light and dark. Edge regions are detected in an image by examining neighborhoods of individual pixels and determining how fast the intensity values vary over the neighborhood. This variation of intensity values is compared with a fixed edge measure threshold. Pixels with variations above the threshold are considered to be part of an edge, and variations lower than the threshold are considered to be part of a gradually varying area. In this approach the value of the edge measure threshold in essence determines the width of the regions that are considered to be edges, that is, in essence determines how sharp the edges are. Different algorithms are then used to assign a black or white value to a pixel depending on whether the pixel lies in an edge region or not. In the examples below, the value of the edge measure threshold is taken to be the contrast-sensitivity parameter. For a lower threshold value, that is, a higher contrast sensitivity, wider regions will be seen as edges, and a so-called point algorithm adapted to produce sharper lines will be applied in these wider regions for assigning black or white pixels. This results in an appearance in the total image of greater sensitivity to contrast variations.

This example of a contrast sensitivity parameter is offered only by way of illustration. Any method for deriving a bitonal image from a digital representation of a document will inherently include some method of adjusting the sensitivity to contrast variations in some coarse or fine-tuned way. The appropriate parameter to adopt as the contrast sensitivity parameter will depend on the particular method used to derive bitonal images from digital representations. Some methods may even provide more than one parameter that may be used. Those skilled in the application of any particular method will readily be able to determine empirically the appropriate parameter to use.

A discussion is now given of the steps that are undertaken in an embodiment of measurement unit 14 and analysis unit 15 for the form document of FIGS. 2A–2G and for other examples. For ease of reference the exposition is set out below as a series of labeled steps.

Step 1.

As a first step it is desirable to run a preliminary check on whether the incoming data stream contains meaningful image data associated with a document. If such data is not present, then the procedures according to the invention may be bypassed and a default contrast sensitivity setting may be used instead. The following example procedure may be used.

First, a preliminary bitonal digital image, used to determine whether a document is present, is made from the input digital image presented on line 11 that is optimized for detecting a document against a specified background. For this purpose the incoming digital image may be subjected to a simple thresholding operation to produce a bitonal image at a fixed threshold. For light documents against a black background, for example, it will generally suffice to set a simple threshold above the level of the background noise.

Using this "document present" bitonal image, count the number of linescans for the incoming frame, the total number of linescans for which white borders were detected and therefore for which measurements were made, count the total number of pixels within the white border, and count the total number of white pixels within the white border.

If the total number of incoming lines is greater than a given threshold (say, 100 representing roughly one-half inch of a document), and if the number of linescans for which white borders were detected and measurements were made is greater than a given percentage (say, 50%) of the incoming lines, and if the total number of white pixels measured is greater than a given percentage (say, 50%) of the total number of pixels measured, then the measurements are considered to be meaningful.

Step 2.

The next step is to read the numerical image-variation measurements. The seventeen bitonal images generated by binary video generator 12 from an incoming video stream are compared in pairs of decreasing contrast sensitivity and a difference image is formed for each pair. The number of black pixels is counted for each difference image. The resulting numerical sequence for the difference curves associated with the document depicted in FIGS. 2A–2G is shown in Table I, where the rows are read from left to right and top to bottom.

TABLE I

| 1,204,575 | 247,329 | 153,941 | 113,752 |
|---|---|---|---|
| 33,566 | 35,448 | 7,079 | 11,603 |
| 3,305 | 5,902 | 3,717 | 5,126 |
| 4,793 | 5,685 | 5,720 | 2,272 |

Step 3.

Normalize the data. The raw data of Table I could be taken as the image-variation sequence associated with this sequence of bitonal images; however, it is generally better to normalize the data first to bring the measurements within a practical working range. At this stage the normalized raw data counts may be interpolated to the resolution desired for selecting the optimizing contrast sensitivities. Any measurements from contrast settings outside the application's practical range are forced to zero at the start of the Table and not included at the end of the Table.

Thus, using the measurements from Table I, the first two entries are forced to zero. The remaining entries are scaled by a power of two such that the largest is between 16,384 (hex 4000) and 32,767 (hex 7FFF), and intermediate interpolated values are inserted to double the number of entries. The interpolation of additional entries will be seen to provide greater resolution in determining possible optimizing contrast sensitivity values. The resulting array, denoted NB[i] for i=0, . . . , 30 and shown in Table II, serves as the image-variation sequence for the series of bitonal images partly depicted in FIGS. 2A–2G. The NB sequence for this example is plotted in FIG. 5, where the points of the sequence are connected by straight line segments so as to be visualized more easily. The curve so displayed will be analyzed below, but first several other examples are presented.

TABLE II

| 0 | 0 | 0 | 9621 | 19242 | 16730 | 14219 | 9206 |
|---|---|---|---|---|---|---|---|
| 4195 | 4312 | 4431 | 2657 | 884 | 1167 | 1450 | 931 |
| 413 | 574 | 737 | 600 | 464 | 552 | 640 | 619 |
| 599 | 654 | 710 | 712 | 715 | 499 | 284 | |

Figure 6:
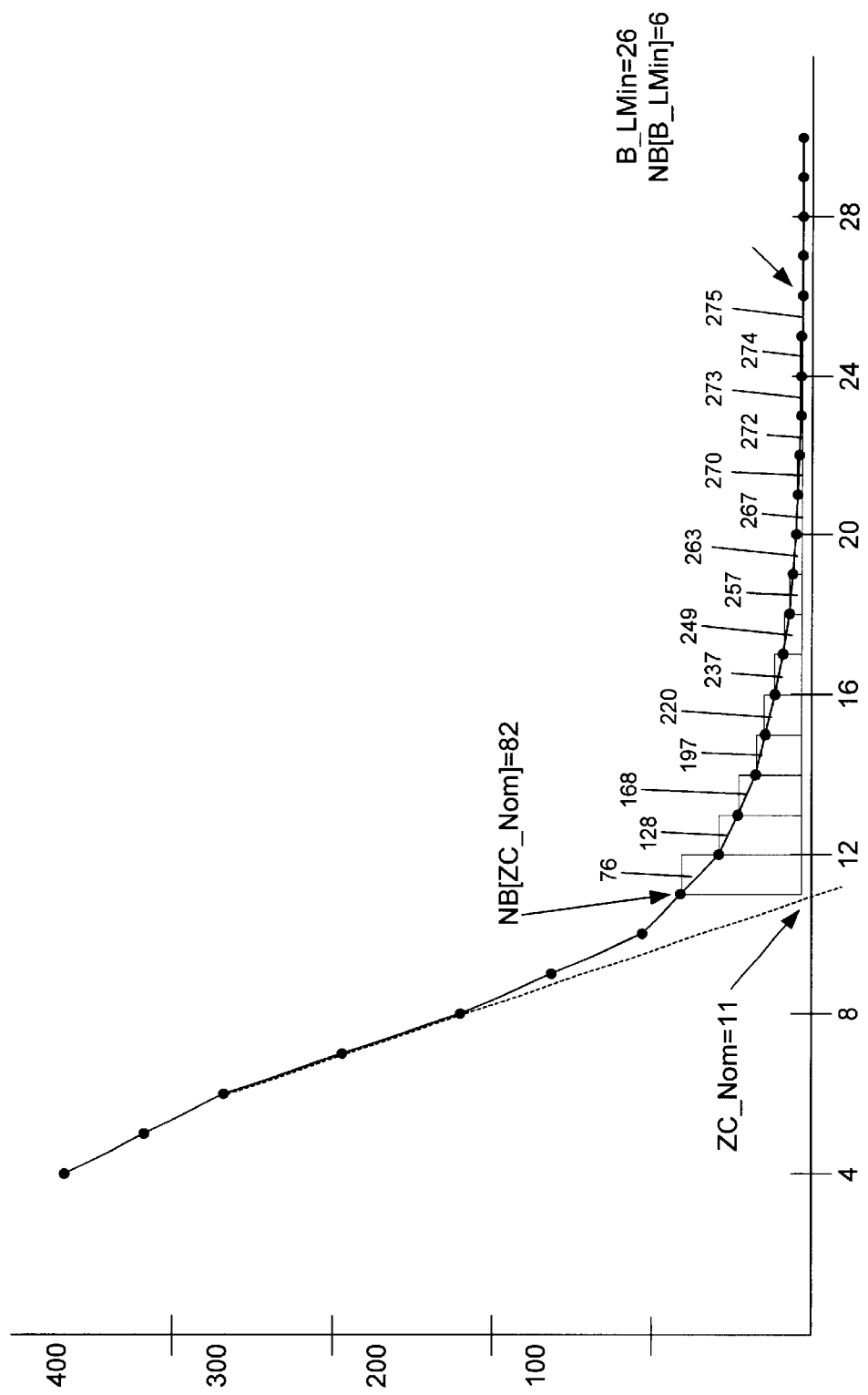
FIG. 6 is a graph showing the image-contrast measure in a second example.

To illustrate the method of the invention, four examples will be presented. The above example derived from the document depicted in FIGS. 2A–2G is designated Example A. Example B is derived from a simple form document. It illustrates the most basic type of curve, which has a single monotonic decrease and an approximately exponentially decaying tail. The interpolated image-variation sequence for this example is displayed in FIG. 6.

Figure 7:
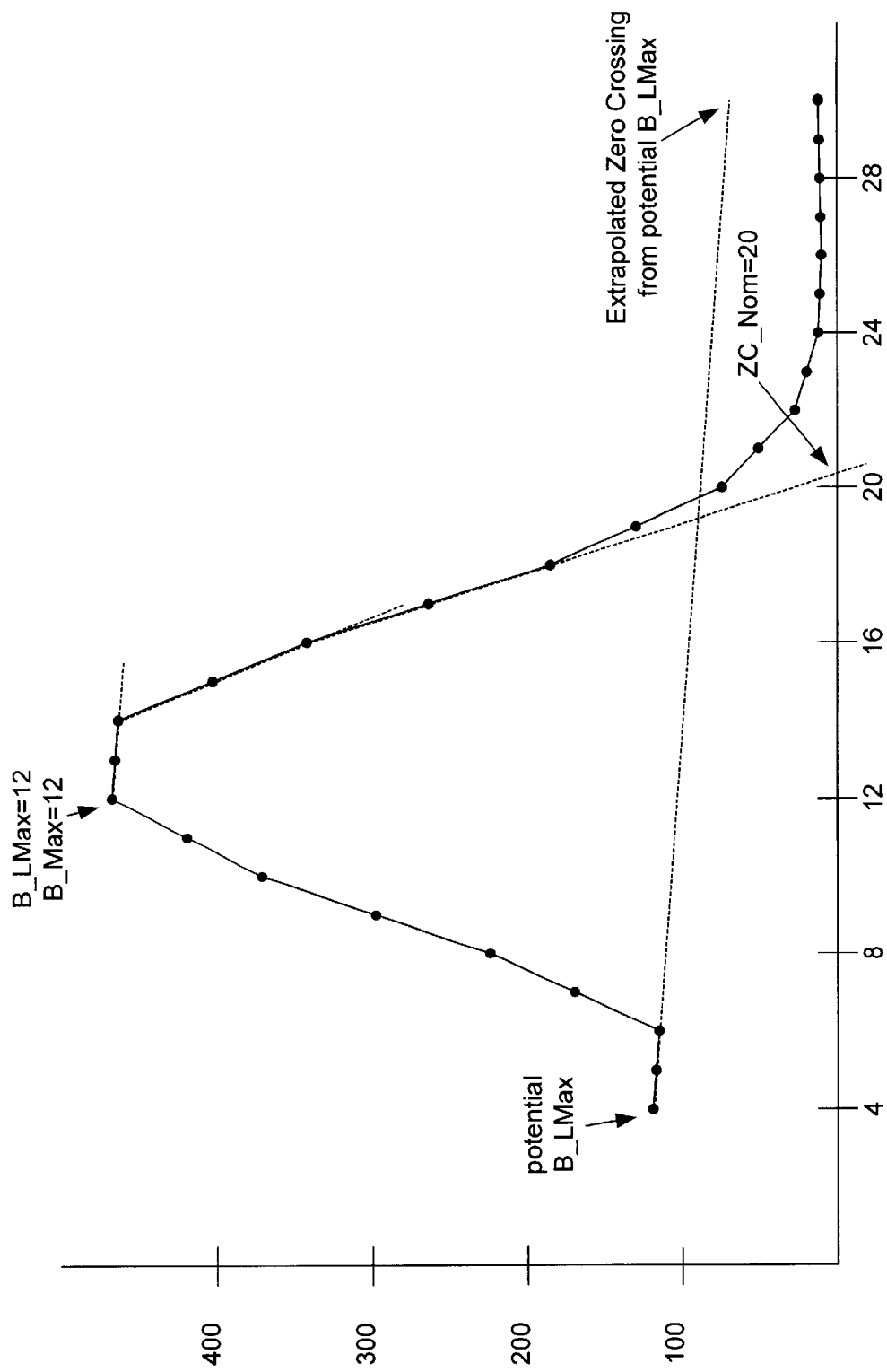
FIG. 7 is a graph showing the image-contrast measure in a third example.

Example C is illustrated in FIG. 7, which shows the interpolated image-variation sequence derived from a banking check that included an overall (non-pictorial) background pattern with line segments added to display a continuous curve for visualization purposes. In general, background patterns such as horizontal or vertical stripes, "basket weaves," "sponge marks," etc. have curves of similar shape.

Figure 8:
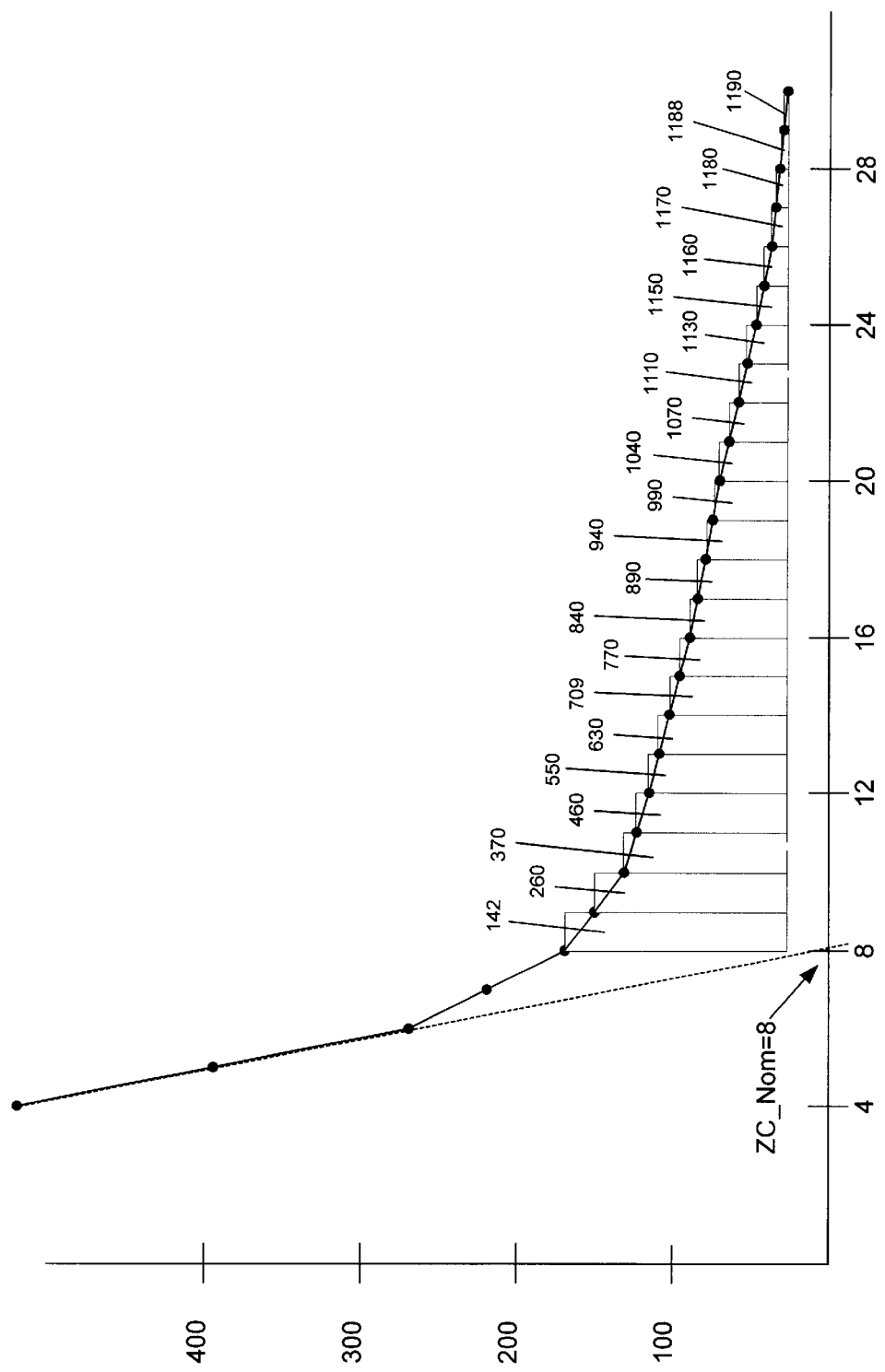
FIG. 8 is a graph showing the image-contrast measure in a fourth example.

Example D is the example of FIG. 8, which shows an interpolated image-variation sequence derived from a check with a picture in the background. The long, gradual decay (more linear than exponential) in the tail of the curve is produced as boundaries of varying contrast drop away.

Step 4.

We now extract the extrapolated zero crossings of the image-contrast curves shown in FIGS. 5–8. The first step is to find and measure the maximum value of NB which is a local maximum, denoted B_Max. The "local maximum" requirement is designed to avoid selecting a maximum at the far edge of the NB curve (i=30 in the example of FIG. 5), which could happen in a "J" shaped curve. This point is labeled B_Max in FIG. 5.

Figure 5:
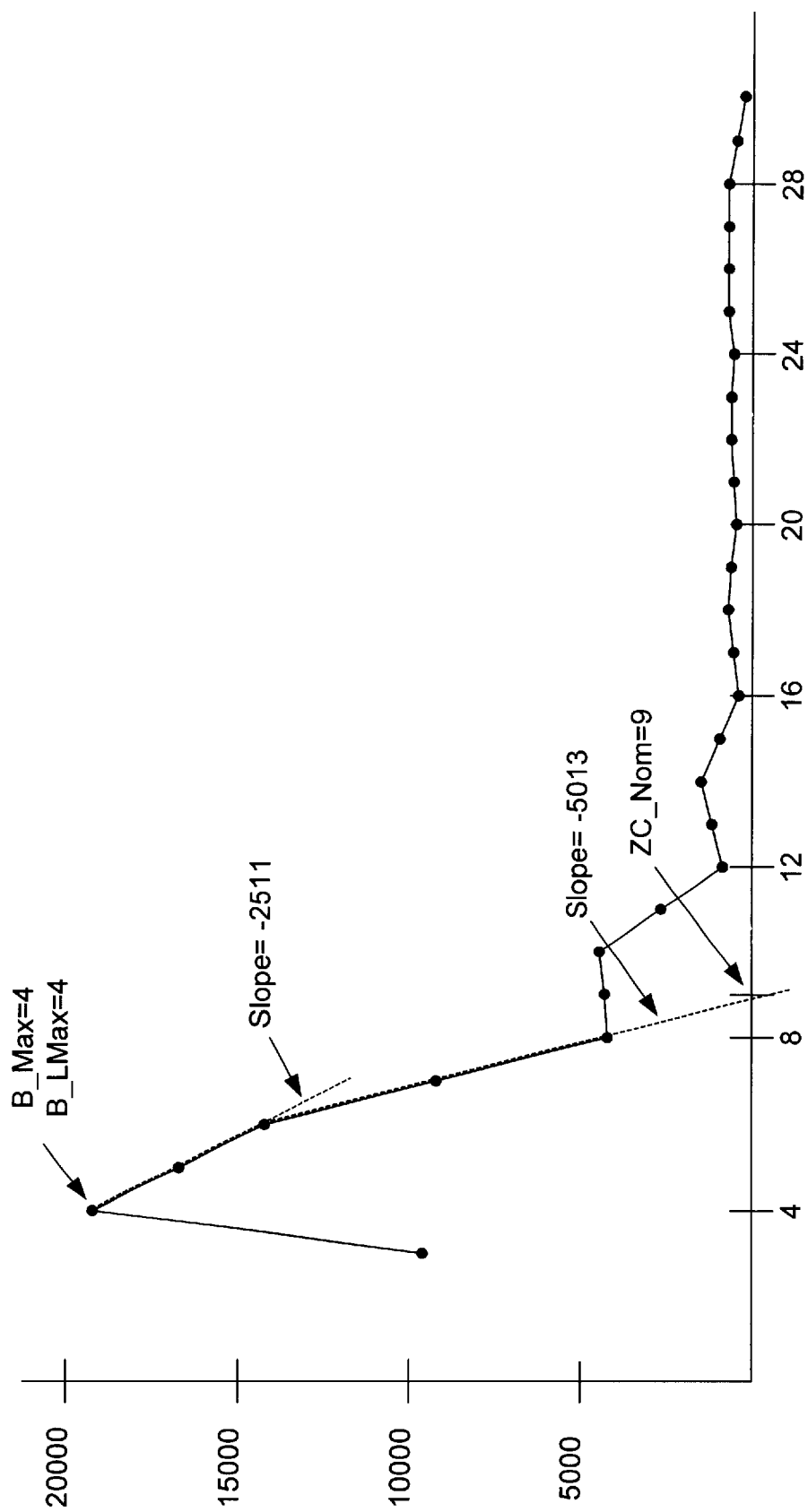
FIG. 5 is a graph showing the image-contrast measure in a first example.

Extrapolate the slope falling down from each local maximum (each potential B_LMax) before and including B_Max to find each peak's zero crossing. While extrapolating, use the steepest slope seen thus far as the extrapolation moves away from B_LMax, as shown in FIG. 5 (for Example A). If the extrapolation goes beyond the points available in the NB curve, set the zero-crossing to the highest index available (30 in these examples), as shown in FIG. 7 (for Example C). Assign the zero crossing with the lowest index value to ZC_Nom (in FIG. 7, ZC_Nom=20, not 30). Set B_LMax to the peak location from which the selected zero crossing was extrapolated (B_LMax=12, not 4, in FIG. 7). Round the selected zero crossing, ZC_Nom, to the closest integer. This provides the normalized extrapolated zero crossing value.

Step 5.

Now a check is made that the results are reasonable. If a value of B_LMax was found before the end of the NB curve, then the result is considered reasonable. Otherwise, the sequence aborts and outputs default value(s) for the contrast sensitivity setting(s).

Step 6.

Figure 9:
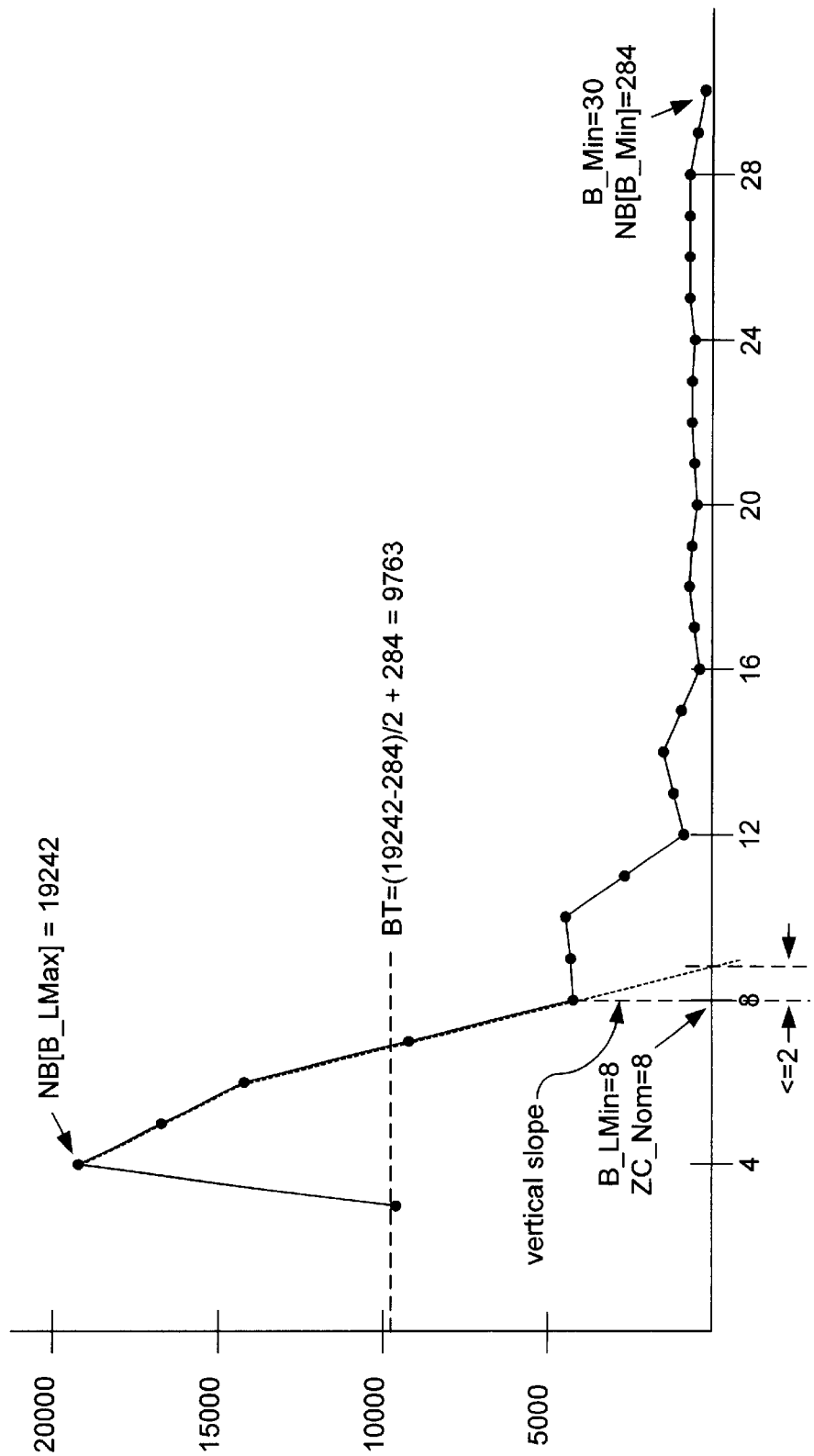
FIGS. 9–12 are graphs showing the analysis of the image-variation measure in the example of FIG. 5.

Next, finish the slope selection for the extrapolated zero crossing. Locate and measure the first local minimum after B_LMax. If such a minimum exists close to ZC_Nom from Step 4, it normally means that the extrapolated slope was not quite steep enough due to another component of the image (such as halftone dots) starting to drop out. To compensate, change the slope to vertical at the local minimum. This is shown in FIG. 9 for Example A.

Locate B_Min, which is the location of the minimum value of the NB curve after B_Lmax. For Example A, B_Min=30.

Locate B_LMin, the first local minimum between B_LMax and B_Min which has a value less than BT, where BT is BTN % (50% in Example A) of the distance between NB[B_LMax] and NB[B_Min]. For Example A, $BT=(NB[B\_LMax]-NB[B\_Min])*BTN/100+NB[B\_Min]=9763,$ $NB[8]=4195<BT,$ and is at a local minimum of the NB curve, $B\_LMin=8.$ If B_LMin is close to but less than ZC_Nom, then adjust ZC_Nom to equal B_LMin. For Example A, ZC_Nom=9, B_LMin=8, $(ZC\_Nom-2)<=B\_LMin<ZC\_Nom,$ therefore ZC_Nom=B_LMin=8.

Other methods of extrapolation could of course be used. The above method was used in a preferred embodiment and is shown here for purposes of illustration. The results for the four examples are summarized in Table III.

TABLE III

| Example A: | B_Max=4 | ZC_Nom=8 | B_LMax=4 |
| Example B: | B_Max=4 | ZC_Nom=11 | B_LMax=4 |
| Example C: | B_Max=12 | ZC_Nom=20 | B_LMax=12 |
| Example D: | B_Max=4 | ZC_Nom=8 | B_LMax=4 |

Step 7.

Figure 10:
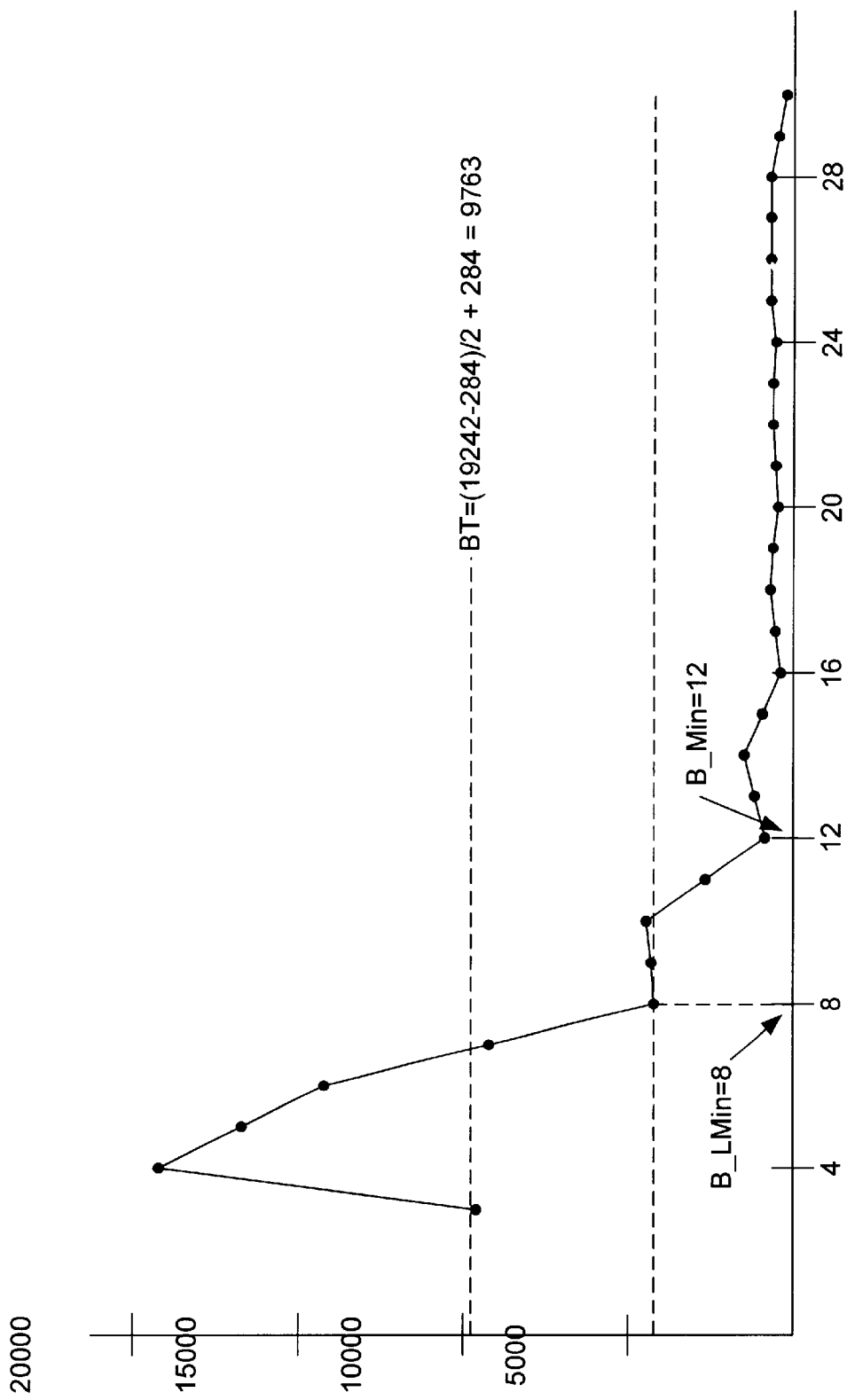

Find the first significant minimum after the extrapolated zero crossing and use it to select the range for the clean tail. If there are more, lower, local minimums between B_LMin and B_Min significantly separated from B_LMin, they tend to indicate that the background patterns (such as halftones) are dropping out, which is desirable for clean image applications. B_Min should be adjusted to the first of these local minimums, since any further dropout is normally due to the undesirable dropout of foreground markings. This is shown in FIG. 10. The purpose for the threshold comparisons is to ignore insignificant wiggles in the graph.

For Example A, starting at i=B_LMin+4, NB[i] for i=12 is the first local minimum for which NB[i]<=BT and NB[i]<=NB[B_LMin].

Therefore set B_Min=12.

Step 8.

Now calculate the area under the first tail. The nominal dark setting, NomDark, will be placed at the setting between ZC_Nom and B_LMin which most nearly holds NA % of the area of the "tail" between these points. The first step in finding this setting is to measure the area under the first tail by accumulating each difference between NB[i] and NB[B_LMin] for ZC_Nom<=i<=B_LMin.

Example A is a degenerate case because

ZC_Nom==B_LMin, which yields Acc1st=0.

For Example B (see FIG. 6), $Acc1st=(82-6)+(58-6)+\ldots+(6-6)=275.$

For Example C (see FIG. 14),

Acc1st=131.

For Example D (see FIG. 8),

Acc1st=1190.

Step 9.

Detect and measure a second tail. When B_LMin is different from B_Min, a second tail is present in the NB curve. This second tail, if it has a significant area, often indicates the presence of background patterns such as halftones or security patterns dropping out, which is desirable for clean images. Care must be taken in using this tail, however, since low-contrast foreground markings could be dropping out instead. Measure the second tail if it exists and if the first tail is short.

Figure 11:
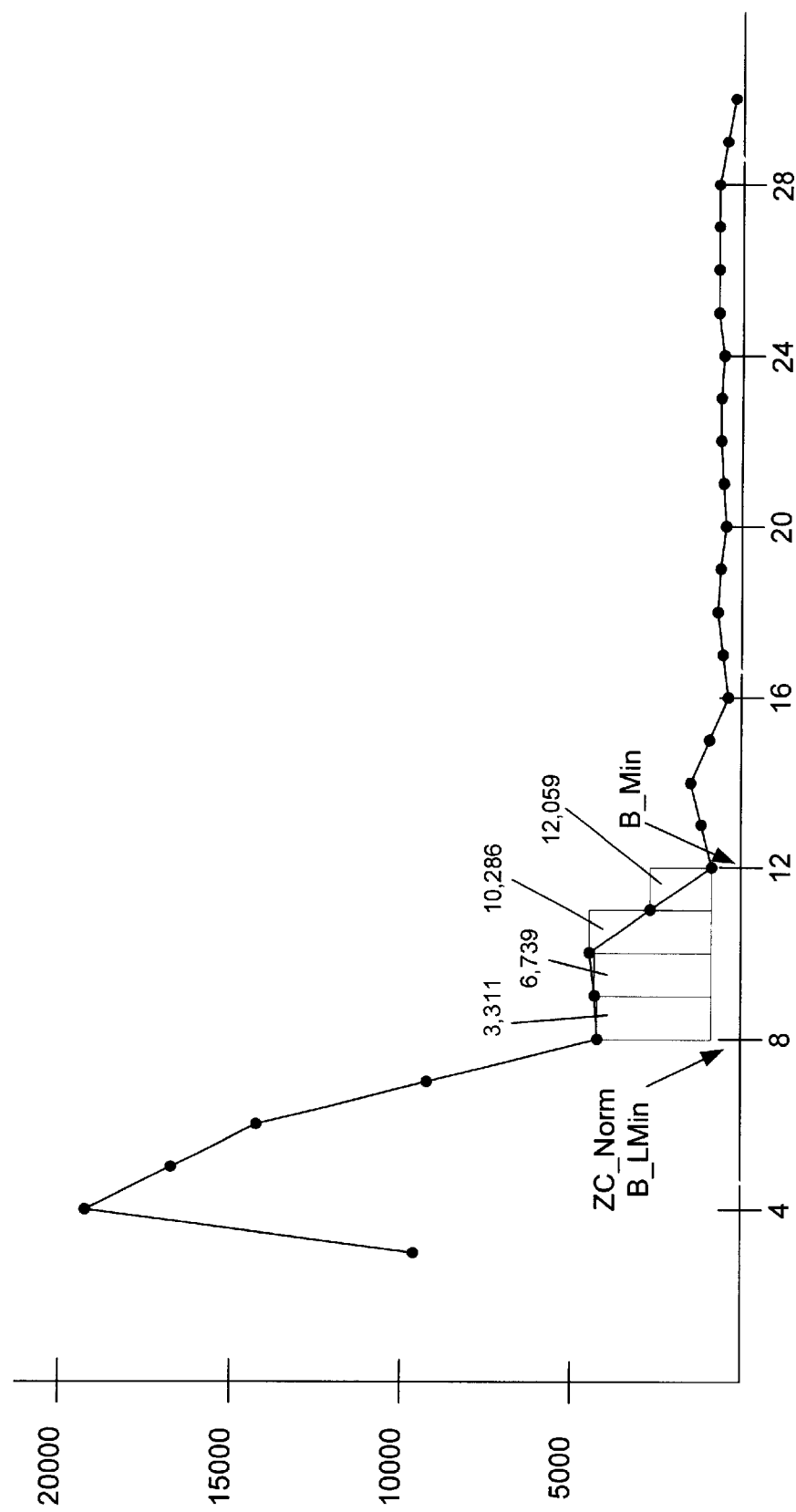

For Example A the second tail exists because B_Min does not equal B_LMin. The first tail is short because B_LMin-ZC_Nom<4. The area under the curve is calculated in FIG. 11:

Acc1st=0, and Acc2nd=12,059.

For Examples B, C and D the second tail does not exist because B_LMin equals B_Min.

Step 10.

Now, select the NomDark and DarkContrast settings. Both of these are dark settings, with NomDark greater than or equal to DarkContrast. Either of these settings may potentially be selected as an optimizing contrast sensitivity. When to use one or the other is addressed below under Step 15.

The first estimate of the dark contrast selection, NomDark, is the position after which DC % of the first tail has accumulated. Select the contrast which is closest to the DC % threshold.

Figure 12:
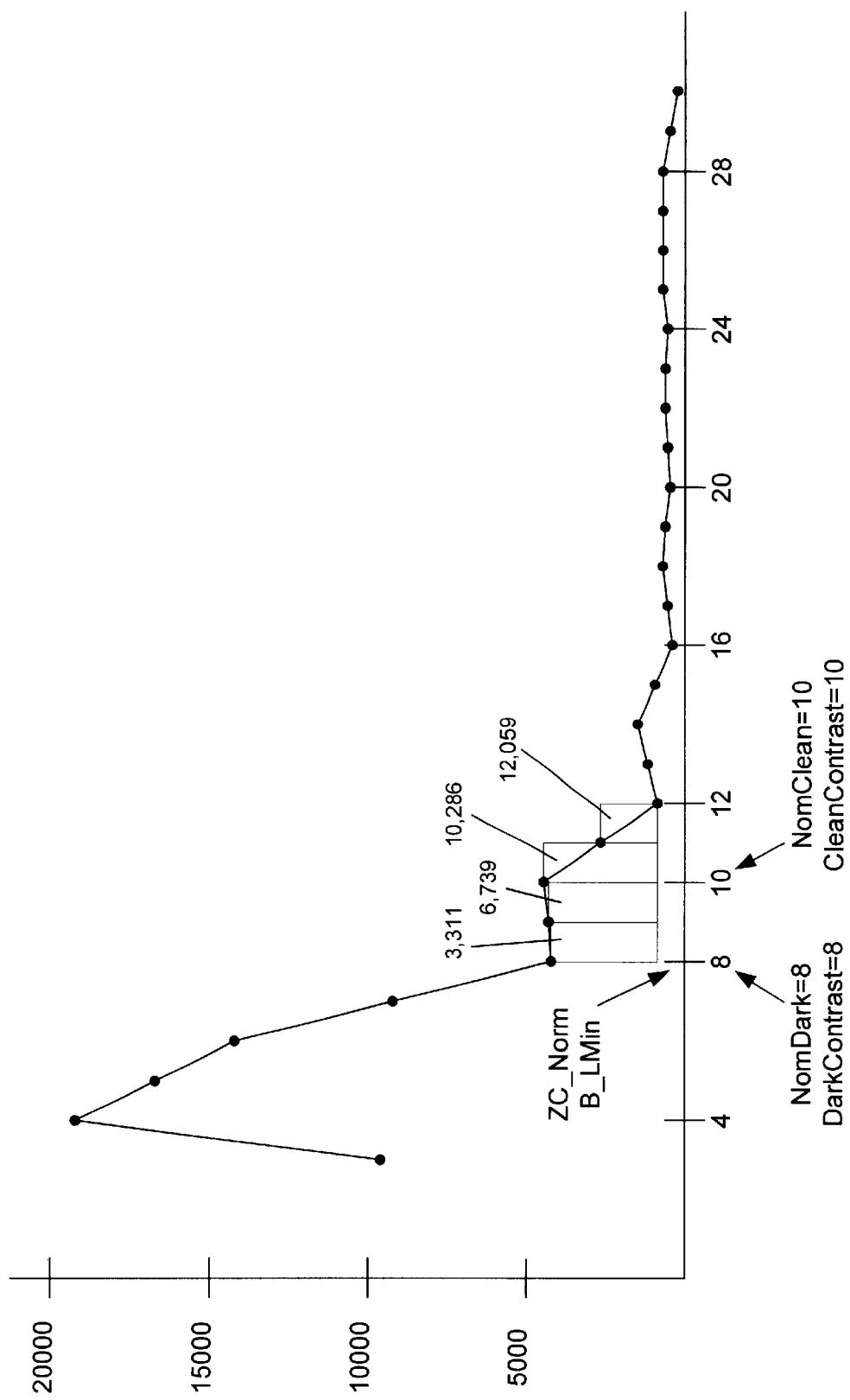

In Example A there is only one position in the first tail, at 8, so NomDark=8, as shown in FIG. 12. This corresponds to the bitonal copy shown in FIG. 2C.

Figure 13:
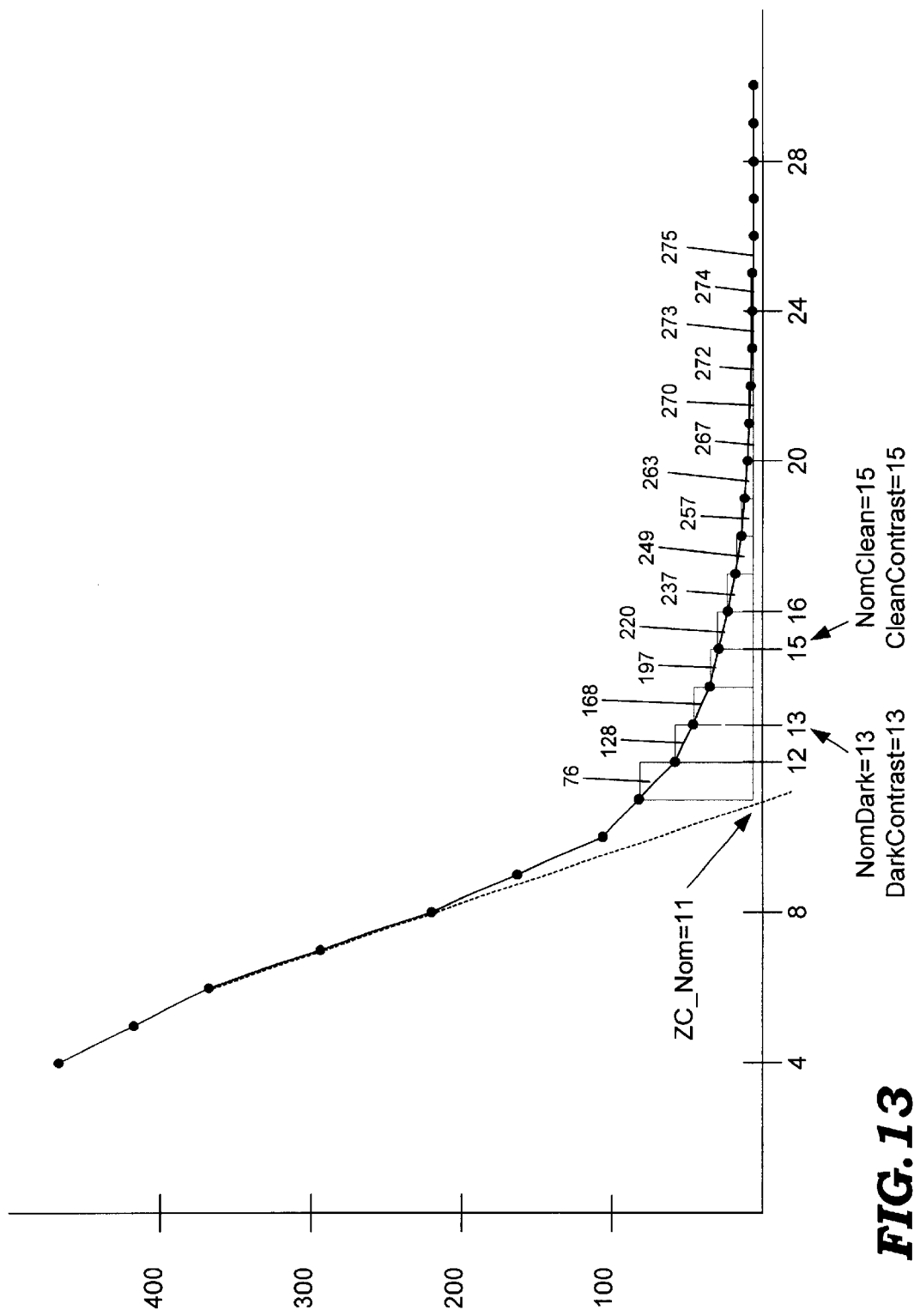
FIG. 13 is a graph showing the analysis of the image-variation measure in the example of FIG. 6.

In Example B set DC % equal to 63% (⅝). Calculate T=275*⅝=172. The accumulated area at i=13 is 168 and at i=14 is 197. Because 168 is closer to T, set NomDark=13, as shown in FIG. 13.

Figure 14:
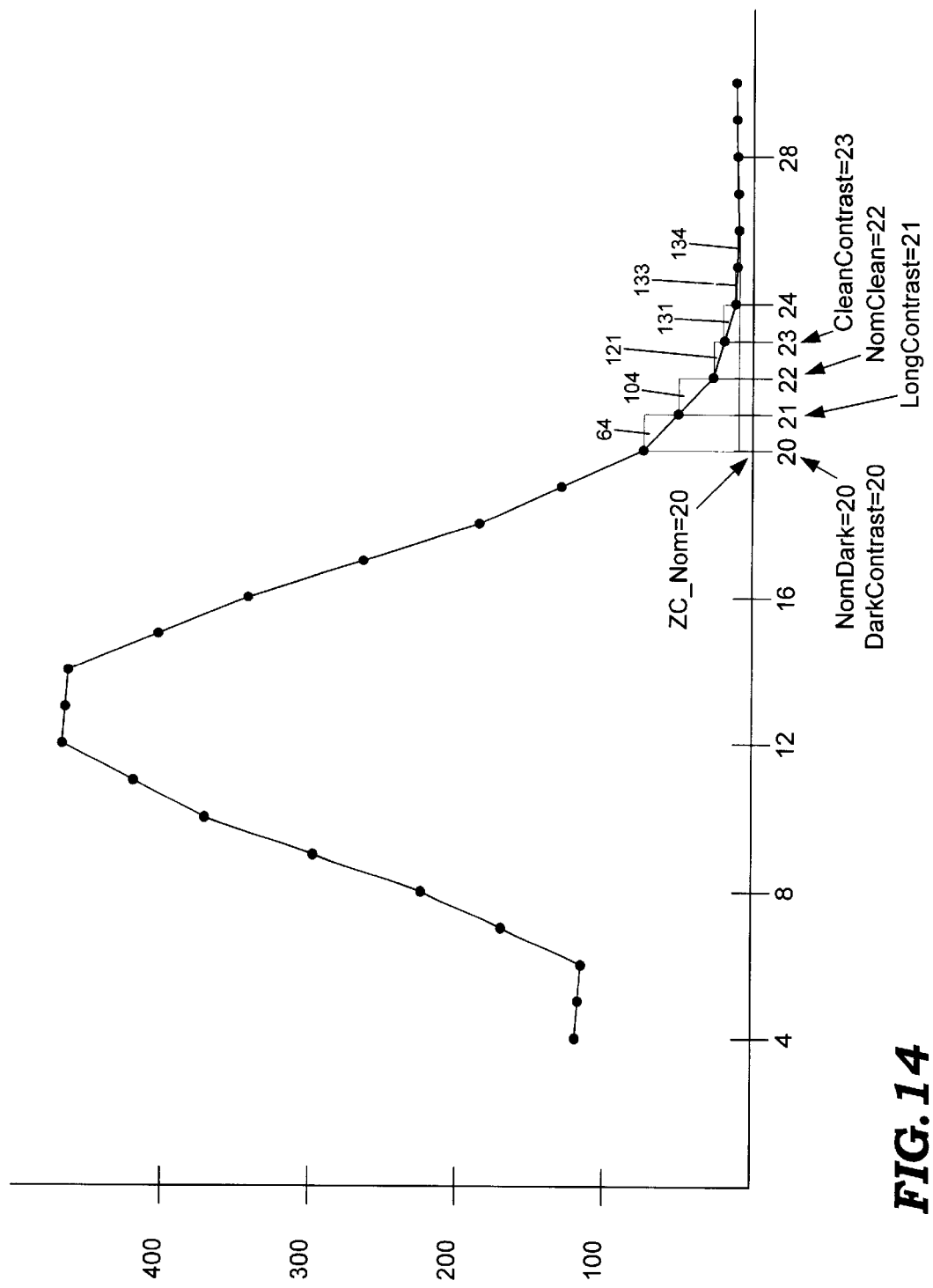
FIG. 14 is a graph showing the analysis of the image-variation measure in the example of FIG. 7.

In Example C set DC % equal to 63% (⅝). Calculate T=134*⅝=84. The accumulated area at i=20 is 64 and at i=21 is 104. These are equidistant from T. Because this is the dark contrast setting, round down and set NomDark=20, as shown in FIG. 14.

Figure 15:
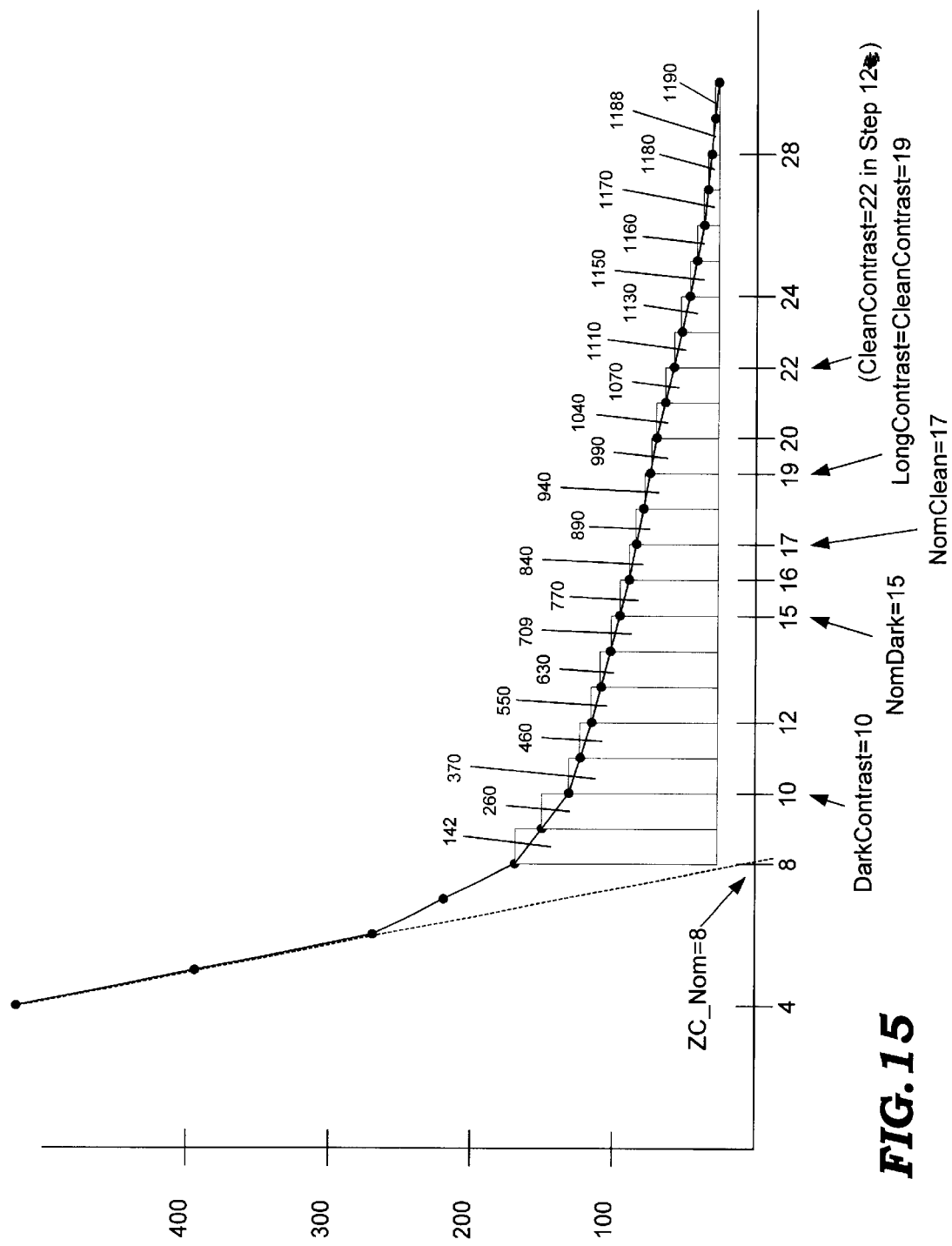
FIG. 15 is a graph showing the analysis of the image-variation measure in the example of FIG. 8.

In Example D set DC % equal to 63% (⅝). Calculate T=1190*⅝=744. The accumulated area at i=15 of 770 is closet to T, so set NomDark=15, as shown in FIG. 15.

Very gradual tails (caused in checks by background pictures gradually fading away, as occurred in Example D) can move the NomDark far away from ZC_Nom. Force the DarkContrast to stay within a selected range of ZC_Nom, as shown in FIGS. 12–15. The results of this step for Examples A–D are as follows. In Example A, $ZC\_{Nom}+2>=NomDark(10>=8),$ so DarkContrast=NomDark=8.

In Example B, $ZC\_Nom+2>=NomDark(13>=13),$ so

DarkContrast=NomDark=13.

In Example C, $ZC\_Nom+2>=NomDark(22>=20)$, so $DarkContrast=NomDark=20$.

In Example D, $ZC\_Nom+2<NomDark(10<15)$, so $DarkContrast=ZC\_Nom+2=10$.

Step 11.

Next select the NomClean and CleanContrast contrast sensitivity settings and decide whether to use a second tail. Both settings are clean settings, with NomClean less than or equal to CleanContrast. When to use which setting is described below under Step 15

The CleanContrast settings are required to be greater than or equal to the DarkContrast settings using in these examples $NomClean=NomDark+FO$ with $FO=2$.

In Example A, $NomClean=NomDark+2=10$.
In Example B, $NomClean=NomDark+2=15$.
In Example C, $NomClean=NomDark+2=22$.
In Example D, $NomClean=NomDark+2=17$.

The criteria for selecting the CleanContrast is dependent on whether there are one or two tails in the image and sometimes on the shape of the tail. If a second tail is present, and the area under the second tail is greater than the area under the first tail (i.e., if Acc2nd is greater than Acc1st), then use the second tail to select the CleanContrast setting, as described in Step 13, otherwise use the first tail as described in the next Step.

Step 12.

Select the CleanContrast setting for single-tail curves. This is based on a percentage of the first tail area, Acc1st, using the same technique as was used for the Dark Contrast but with a different percentage threshold. In some applications a single percentage threshold, CC %, is sufficient. It should be set between the DC % (defined above in Step 10) and 100%. For Example B, set CC % equal to 75% ($3/4$). Calculate $T=275*3/4=206$. The accumulated area at i=14 is 197 and at i=15 is 220. Because 197 is closer to T, set CleanContrast=15. This is equal to NomClean, so it need not be increased.

In applications such as check processing where it is possible to get background pictures dropping away, using a percentage threshold which is good for most images will cause the CleanContrast setting on the slow-falling tails such as that in Example D to be too high, and too many of the foreground markings will be lost. By identifying the shape type, two different thresholds (LC % and CC %) of the accumulated area under the tail can be used. The identification technique used in the preferred embodiment is given in the following steps, but many other criteria could be used.

Find two threshold points in the tail, called CleanContrast and LongContrast, where CleanContrast is greater then or equal to LongContrast, by finding the location in the curve where the accumulated area under the tail is closest to the thresholds LC % and CC %. For Example C, set LC % equal to 81% ($26/32$), CC %=94% ($30/32$). Calculate $LT=134*26/32=109$. Calculate $T=134*30/32=126$. The accumulated area at i=21 of 104 is closest to LT, therefore set LongContrast=21. The accumulated area at i=23 of 131 is closest to T, so set CleanContrast=23.

For Example D, set LC %=81% ($26/32$), CC %=94% ($30/32$). Calculate $LT=1190*26/32=967$. Calculate $T=1190*30/32=1116$. As shown in FIG. 15, the accumulated area at i=19 of 990 is closest to LT, so set LongContrast=19. The accumulated area at i=22 is closest to T, so set CleanContrast=22.

If long-tail detection criteria such as implemented in the illustrative code of Appendix A imply that a long-tail disposition is present, then set CleanContrast (called CleanET in Appendix A) equal to LongContrast (called LongET in Appendix A). Also force NomClean (called NomCET in Appendix A) to be less than or equal to CleanContrast since NomDark (on which NomClean was based) might also have been too high.

In Example C because CleanContrast and ZCNom are not widely separated CleanContrast remains unchanged at 23. In Example D because ZC_Nom is in the lower half of the contrast range (so this is not an Example C type curve), and because CleanContrast and ZCNom are widely separated, and because NomDark is greater than Dark Contrast, CleanContrast=LongContrast=19.

Sometimes the tail is short because the curve is U-shaped with a significant rise after B_Min, but with no second minimum occurring. In this case the clean threshold might be too close to the dark threshold, and it is adjusted upward to position B_Min+1 as shown in detail in the code of Appendix A.

Step 13.

Select the CleanContrast setting for two-tail curves. This is based on a percentage of the second tail area, Acc2nd, using the same technique as was used for the DarkContrast, but with a different percentage threshold.

Select a percentage threshold, CC %. It should be set between the DC % (defined above in Step 10) and 100%. It is normally less than the threshold used for single-tail curves. In Example A, set CC % equal to 75%. Calculate $T=12,059*3/4=9,044$. The accumulated area at i=10 is 10,286, which is closest to T, so set CleanContrast=10. This corresponds to the bitonal coy shown in FIG. 2D.

If long-tail detection criteria such as implemented in the code of Appendix A imply that a long-tail disposition is present, then set CleanContrast=B_LMin+2. In Example A because CleanContrast and ZC_Nom are not widely separated CleanContrast remains unchanged at 10.

Step 14.

At this point there are four available contrast sensitivity selections, ordered $DarkContrast<=NomDark<=NomClean<=CleanContrast$.

Each of these can be potentially modified by operator-supplied parameters such as signed offsets adjustments, minimum settings, and maximum settings for each selection.

Step 15.

One or more of the available contrast sensitivities from Step 14 are selected for generating the output bitonal image copy or copies. Several application types are summarized here. Many others are possible.

Clean Only Output.

These applications must select between the NomClean and the CleanContrast settings. The rule applied is to use the CleanContrast setting if it is close to the NomClean setting. If the settings are significantly separated, use the more sensitive setting if the dropout which separated them might have been from foreground markings. This would be the case if the form type is high-contrast (as specified for example by a system operator) or if halftones were not detected. For example, in the implementation of Appendix A a flag HT is set whenever halftone criteria are satisfied indicating halftones or halftone-like background patterns are likely present. If the source might include low-contrast carbonless forms (as specified by an operator), the CleanContrast setting is always selected.

Dark Only.

If no halftones were detected and carbonless forms are not in use, the cleaner option (NomDark) is preferred. Otherwise use the more sensitive option (DarkContrast).

Clean Always and Dark Occasionally.

Select only one, clean, contrast setting if no halftones were detected or if high contrast forms are in use or if CleanContrast and DarkContrast are close. Use NomClean unless carbonless forms are in use, in which case CleanContrast is preferred. If using both a dark and a clean setting (not just clean), use CleanContrast and DarkContrast.

Dark Always and Clean Occasionally.

Send only one, dark, contrast sensitivity setting if no halftones were detected or if CleanContrast and DarkContrast are close. Use NomDark unless carbonless forms are in use, in which case DarkContrast is preferred. If using both a dark and a clean setting (not just dark), use CleanContrast and DarkContrast.

Both Always.

Always use CleanContrast (never NomClean). If halftones were detected or if carbonless forms are in use, use DarkContrast. Otherwise use NomDark. If the selected Dark and Clean images are too close, nudge them apart.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the above description and illustrations, but is defined by the appended claims.

APPENDIX A

```
/*
 * Copyright © Picture Elements, Inc.
 *
 */
#if !defined(WINNT)
#ident "$Id: hiq.c,v 1.9 2001/02/07 03:33:13 steve Exp $"
#endif
# include "thr2p.h"
# include "hiq.h"
# include <assert.h>
/* # define DEBUG_MSGS 1 */
# define BIT(v,b) ( ((v)>>(b)) & 1 )
void hiq_calculate(const struct thr2p_stats_t*stats, struct hiq_mode*mode)
{
            unsigned BMSB = 31, ZC_Nom, B_Min, B_Max, B_LMax, B_LMin, TailNC, TailND;
            unsigned short TailAreaC, TailAreaD;
            signed short LMin, Min, Max;
            unsigned char CleanET, DarkET, NomCET, NomDET, LongET;
            int HT, LT, SameTail;
            unsigned long B[16];
            signed long NB[31], OB[32];
#ifdef DEBUG_MSGS
            printf("white area : %u ", stats->white_area);
            printf("white pix : %u ", stats->white_pix);
            printf("white lines: %u ", stats->white_lines);
            printf("measuremnts: %04x %04x %04x %04x ", stats->M0[0]
                  stats->M0 [1], stats->M0 [2], stats->M0 [3]);
            printf("            : %04x %04x %04x %04x ", stats->M0 [4],
                  stats->M0 [5], stats->M0 [6], stats->M0 [7]);
            printf("            : %04x %04x %04x %04x ", stats->M0 [8],
                  stats->M0 [9], stats->M0 [10], stats->M0 [11]);
            printf("            : %04x %04x %04x %04x ", stats->M0 [12]
                  stats->M0 [13], stats->M0 [14], stats->M0 [15])
#endif
            {unsigned j;
              B [0] = 0;
              B [1] = 0;
              for (j = 2 ; j < 16 ; j += 1)
                  B [j] = stats->M0 [j];
            }
            /* 3.1.1 */
            while ((BIT(stats->white_area, BMSB) == 0) && (BMSB > 15))
                  BMSB -= 1;
#if 0
            BlkD = 0;
            { unsigned long MsrAreaN = stats->white_area >> (BMSB-15);
              unsigned long WhtSeen = (stats->white_pix >> (BMSB-15)) << 16;
              unsigned short WhtP = WhtSeen / MsrAreaN;
              if (WhtP < 0x8000)
                  BlkD = 1;
            }
#endif
```

APPENDIX A -continued

```
#ifdef DEBUG_MSGS
        puts("3.1.2. Normalize the B data (Rev 1.3)");
#endif
        { unsigned long CN = 0;
        unsigned j, N;
        for (j = 0 ; j < 16 ; j += 1)
                CN |= B [j];
        BMSB = 31;
        while ((BIT(CN,BMSB) == 0) && (BMSB > 15))
                BMSB -= 1;
        N = BMSB - 14;
        NB [0] = B [0] >> N;
        for (j = 1 ; j <= 15 ; j += 1) {
                NB [2*j] = B [j] >> N;
                NB [2*j-1] = NB [2*j]/2 + NB [2*(j-1)]/2;
        }
        }
#ifdef DEBUG_MSGS
        { puts("NB Array --");
        printf(" 0: %5ld %5ld %5ld %5ld %5ld %5ld %5ld %5ld ",
                NB [0], NB [1], NB [2], NB [3], NB [4], NB [5], NB [6], NB [7]);
        printf(" 8: %5ld %5ld %5ld %5ld %5ld %5ld %5ld %5ld ",
                NB [8], NB [9], NB [10], NB [11], NB [12], NB [13], NB [14], NB [15]);
        printf("16: %5ld %5ld %5ld %5ld %5ld %5ld %5ld %5ld ",
                NB [16], NB [17], NB [18], NB [19], NB [20], NB [21], NB [22], NB [23]);
        printf("24: %5ld %5ld %5ld %5ld %5ld %5ld %5ld ",
                NB [24], NB [25], NB [26], NB [27], NB [28], NB [29], NB [30]);
        }
#endif
#ifdef DEBUG_MSGS
        puts("3.1.3. Find the Extrapolated Zero Crossing of the NB curve");
#endif
        { unsigned i, j;
        signed short Slope, ZO;
        Max = 0;
        B_Max = 0;
          /* 1. Find and measure the maximum value . . . */
        for (i = 0 ; i < 30 ; i += 2) {
                if ((NB [i] >= Max) && (NB [i]>NB [i+1])) {
                        Max = NB [i];
                        B_Max = i;
                }
        }
#ifdef DEBUG_MSGS
        printf("B_Max: %u ", B_Max);
#endif
        if (Max == 0) goto use_fixed_edge_thr;
          /* 2. Extrapolate the slope . . . */
        Max = 0;
        ZC_Nom = 31;
        for (j = 0 ; j <= B_Max ; j += 2) {
                if ((NB [j] >= Max) && (NB [j] > NB [j+1])) {
                        int BiggerSeen = 0;
                        Max = NB [j];
                        i = j;
                        ZO = NB [i]
                        Slope = 0;
                        while ((ZO > 0) && (i < 30)) {
                                if (NB [i+1] >= Max)
                                        BiggerSeen = 1;
                                if ((BiggerSeen == 0) && ((NB [i] - NB [i+1]) > Slope))
                                        Slope = NB [i] - NB [i+1];
                                ZO = ZO - Slope;
                                i = i + 1;
                        }
                        if ((ZO < 0) && ((ZO+Slope) < -ZO))
                                i = i - 1;
                        if (i < ZC_Nom) {
                                ZC_Nom = i;
                                B_LMax = j;
                        }
                }
        }
#ifdef DEBUG_MSGS
        printf("ZC_Nom: %u ", ZC_Nom);
#endif
        }
```

-continued

APPENDIX A

```
#ifdef DEBUG_MSGS
        puts("3.1.4. Locate and measure the local minimum");
#endif
        { signed short BT;
        unsigned i;
            /* 1. Locate and measure the minimum value of NB after
               ZC_Nom at point B_Min; */
        B_Min = ZC_Nom;
        Min = 0x7fff;
        for (i = ZC_Nom ; i <= 30 ; i += 1) {
                if (NB [i] < Min) {
                        B_Min = i;
                        Min = NB [i];
                }
        }
            /* 2. Calculate the N% (50%) value above the minimum, where
               N is a compile time constant. */
        BT = (Max - Min)/2 + Min;
            /* 3. Locate B_LMin, the first local minimum between B_Max
               and B_Min which has a value less than BT. */
        assert(B_Min <= 30);
        i = B_LMax+1;
        while ((i < B_Min)
                && !((NB [i] <= BT) && (NB [i] < NB [i-1]) && (NB [i] <= NB [i+1])))
                i += 1;
        assert(i < 31);
        B_LMin = i;
        LMin = NB [i];
        if (((ZC_Nom-2) <= B_LMin) && (B_LMin < ZC_Nom))
                ZC_Nom = B_LMin;
#ifdef DEBUG_MSGS
        printf ("B_LMin: %u ", B_LMin);
#endif
            /* 4. If there are more minimums after B_LMin, ... */
        if ((B_Min > B_LMin)
            && ((B_Min - B_LMin) > 4)) {
                i = B_LMin+4;
                assert( B_Min < 31 );
                while ((i < B_Min)
                        && !((NB [i] <= BT) && (NB [i] < NB [i-1]) && (NB [i] <= LMin)))
                        i += 1;
                B_Min = i;
                Min = NB [i];
        }
#ifdef DEBUG_MSGS
        printf("B_Min: %u ", B_Min);
#endif
        }
#ifdef DEBUG_MSGS
        puts("3.1.5. Measure the area under the tail");
#endif
        { unsigned i;
          for (i = 0 ; i < 32 ; 1 += 1)
                OB [i] = 0;
            /* 1. Measure the area under the first tail. */
          assert (ZC_Nom > 0);
        assert(B_LMin < 31);
        TailND = 0;
        TailAreaD = 0;
        OB [ZC_Nom-1] = 0;
        OB [B_LMin+1] = 0;
        for (i = ZC_Nom ; i <= B_LMin ; i += 1) {
                unsigned short temp;
                if (NB [i] > LMin) {
                        temp = NB [i] - LMin;
                } else {
                        temp = 0;
                }
                OB [i] = temp;
                TailAreaD += temp >> TailND;
                if (TailAreaD & 0x8000U) {
                        TailAreaD /= 2;
                        TailND += 1;
                }
        }
            /* Detect whether a second tail is present ... */
        TailAreaC = 0;
```

-continued

APPENDIX A

```
        TailNC = 0;
        OB [B_Min+1] = 0;
        if ((B_LMin==B_Min) || ((B_LMin-ZC_Nom) > 4)) {
            TailAreaC = TailAreaD;
            TailNC = TailND;
            SameTail = 1;
        } else {
            SameTail = 0;
            Min = NB [B_Min];
            for (i = B_LMin ; i <= B_Min ; i += 1) {
                unsigned short temp;
                if (NB [i] > Min) {
                    temp = NB [i]-Min;
                } else {
                    temp = 0;
                }
                OB [i] = temp;
                TailAreaC += temp>>TailNC;
                if (TailAreaC & 0x8000) {
                    TailAreaC /= 2;
                    TailNC += 1;
                }
            }
            if ((TailNC < TailND) ||
              ((TailNC==TailND) && (TailAreaC<=TailAreaD))) {
                SameTail = 1;
                TailAreaC = TailAreaD;
                TailNC = TailND;
            }
        }
#ifdef DEBUG_MSGS
        printf("TailAreaD: %u (%u << %u) ", TailAreaD<<TailND,
            TailAreaD, TailND);
        printf("TailAreaC: %u (%u << %u) ", TailAreaC<<TailNC,
            TailAreaC, TailNC);
        printf("SameTail: %u ", SameTail);
#endif
    }
#ifdef DEBUG_MSGS
    { unsigned j;
      puts("OB Array --");
      for (j = 0 ; j < 32 ; j += 8) {
          printf("%2u: %5ld %5ld %5ld %5ld %5ld %5ld %5ld %5ld ", j,
            OB [j+0], OB [j+2], OB [j+2], OB [j+3],
            OB [j+4], OB [j+5], OB [j+6], OB [j+7]);
      }
    }
#endif
#ifdef DEBUG_MSGS
    puts("3.1.6. Make the tail-area based clean, nominal, and dark"
        "edge thresholds.");
#endif
    { unsigned i, iMax;
      unsigned long NomArea, CleanArea, TwoTailT, LongTailT;
      unsigned short thresh, threshT, acc, temp;
      switch (mode->doc_type) {
        default:
            NomArea = 20;
            CleanArea = 31;
            TwoTailT = 16;
            LongTailT = 26;
            break;
      }
      thresh = (NomArea * (unsigned long)TailAreaD) / 32UL;
#ifdef DEBUG_MSGS
      printf("ThreshD: %u ", thresh);
#endif
      i = ZC_Nom;
      acc = 0;
      temp = 0;
      while ((i <= B_LMin) && (acc < thresh)) {
          temp = acc;
          acc += OB [i]>>TailND;
          i += 1;
#ifdef DEBUG_MSGS
          printf("i= %u, acc= %u, ThreshD=%u ", i, acc, thresh);
#endif
```

-continued

APPENDIX A

```
        }
        NomDET = i;
        if ((acc > thresh)
                && (thresh > temp)
                && ((acc-thresh) > (thresh-temp)))
                    NomDET = i - 1;
        DarkET = ZC_Nom + 2;
        if (NomDET < DarkET)
                DarkET = NomDET;
                /* 2. Calculate the clean threshold based on tail area. */
        NomCET = NomDET + 2;
        LongET = NomDET;
        if (!SameTail) {
                    i = B_LMin;
                    acc = 0;
                    iMax=B_Min;
                    threshT = (TwoTailT*(unsigned long)TailAreaC) / 32UL;
                    thresh = threshT;
        } else {
                    acc = acc >> (TailNC-TailND);
                    threshT = (LongTailT*(unsigned long)TailAreaC) / 32UL;
                    thresh = (CleanArea * (unsigned long)TailAreaC) / 32UL;
                    iMax = B_LMin;
        }
        temp = acc;
        while ((i <= iMax) && (acc < thresh)) {
                    if (acc <= threshT)
                        LongET = i;
                    temp = acc;
                    acc += OB [i] >> TailNC;
                    i += 1;
#ifdef DEBUG_MSGS
                    printf("i= %u, acc= %u, ThreshT=%u, ThreshC=%u ", i,
                        acc, threshT, thresh);
#endif
        }
        CleanET = i;
        if ((acc > thresh) &&
            (thresh > temp) &&
            ((acc-thresh) > (thresh-temp)))
                CleanET = i - 1;
        if (CleanET < NomCET)
                CleanET = NomCET;
#ifdef DEBUG_MSGS
        printf("DarkET = %u ", DarkET);
        printf("NomDET = %u ", NomDET);
        printf("LongET = %u ", LongET);
        printf("CleanET= %u ", CleanET);
#endif
        }
#ifdef DEBUG_MSGS
        puts("3.1.7. Look for evidence of halftones in image");
#endif
        HT = 0;
        LT = 0;
        if (SameTail) {
                if ((ZC_Nom < 16) && ((CleanET-ZC_Nom>8) && (NomDET>ZC_Nom+2))) {
                    HT = 1;
                    LT = 1;
                    CleanET = LongET;
                    NomDET = ZC_Nom + 2;
                    if (NomCET > LongET)
                        NomCET = LongET;
                }
        }
        if ((Max >> 5) < LMin)
            HT = 1;
        if ((!SameTail) && ((CleanET-NomDET) >= 4))
            HT = 1;
        if (SameTail && ((CleanET-NomDET) >= 6))
            HT = 1;
        if ((HT != 0)
            && (LT == 0)
            && (B_LMin != B_Min)
            && ((CleanET-NomDET) <= 4)
            && (B_LMin >= CleanET))
                CleanET = B_LMin + 1;
```

-continued

APPENDIX A

```
        /* 3. If the tail was short . . . */
        if (HT && (B__LMin==B__Min) && ((CleanET-NomDET) <= 4)) {
          signed long EMax = Min;
          signed long tmpl;
          unsigned i;
          for (i = B__LMin+1 ; i <= 30 ; i += 1) {
                if (NB [i] >= EMax)
                    EMax = NB [i];
          }
          tmpl = ((EMax - Min) << 16) / (Max - Min);
          if ((tmpl > 0x400) && (B__Min >= CleanET))
                CleanET = B__Min + 1;
        }
        /* 4. If the second tail was very long, . . . */
        if ((!SameTail) && (ZC__Nom < 16) && ((CleanET-NomDET)>8)) {
                CleanET = B__LMin+2;
                if (NomCET > CleanET)
                    NomCET = CleanET;
        }
#ifdef DEBUG__MSGS
        printf ("Halftone = %d ", HT);
#endif
        if (mode->enable & 0x20) { /* if DarkHiQEnF */
            if (mode->dark__ethr__off < -DarkET)
                DarkET = 0;
            else
                DarkET = DarkET + mode->dark__ethr__off;
            if (DarkET < 2)
                DarkET = 2;
            if (DarkET > 28)
                DarkET = 28;
            if (mode->dark__ethr__off < -NomDET)
                NomDET = 0;
            else
                NomDET = NomDET + mode->dark__ethr__off;
            if (NomDET < 2)
                NomDET = 2;
            if (NomDET > 28)
                NomDET = 28;
        } else {
                DarkET = mode->dark__ethr__val;
                NomDET = mode->dark__ethr__val;
        }
        if (mode->enable & 0x10) { /* if CleanHiQEnF */
            if (mode->clean__ethr__off < -CleanET)
                CleanET = 0;
            else
                CleanET = CleanET + mode->clean__ethr__off;
            if (CleanET < 2)
                CleanET = 2;
            if (CleanET > 28)
                CleanET = 28;
            if (mode->clean__ethr__off < -NomCET)
                NomCET = 0;
            else
                NomCET = NomCET + mode->clean__ethr__off;
            if (NomCET < 2)
                NomCET = 2;
            if (NomCET > 28)
                NomCET = 28;
        } else {
                CleanET = mode->clean__ethr__val;
                NomCET = mode->clean__ethr__val;
        }
#ifdef DEBUG__MSGS
        printf("HiQ threshold options: ");
        printf("DarkET = %u ", DarkET);
        printf("NomDET = %u ", NomDET);
        printf("NomCET = %u ", NomCET);
        printf("CleanET = %u ", CleanET);
#endif
        /* XXXX */
        /* Clean only. . . */
        if (mode->enable & HiQ_ENABLE_CLEAN) {
          switch (mode->doc_type) {
            default:
                if ( (CleanET-NomCET) <=2 )
```

-continued

APPENDIX A

```
                mode->clean_thr = CleanET;
            else if (HT)
                mode->clean_thr = CleanET;
            else
                mode->clean_thr = NomCET;
            break;
        }
    } else {
        mode->clean_thr = 0;
    }
    if (mode->enable & HiQ_ENABLE_DARK) {
        switch (mode->doc_type) {
            default:
                if (HT)
                    mode->dark_thr = DarkET;
                else
                    mode->dark thr = NomDET;
                break;
        }
    } else {
        mode->dark_thr = 0;
    }
#ifdef DEBUG_MSGS
        printf("clean thr: %u ", mode->clean_thr);
        printf("dark thr: %u ", mode->dark_thr);
#endif
        return;
    use_fixed_edge_thr:
        puts("Punting to fixed edge threshold.");
        mode->clean_thr = mode->clean_ethr_val;
        mode->dark_thr = 0;
}
    /*
```

What is claimed is:

1. A method of processing a digital image of a document to provide a digital copy having a selected image quality, the digital image comprising an array of pixels representing at least a portion of said document, comprising the steps of:

deriving from said digital image at least three bitonal copies thereof at corresponding distinct contrast sensitivities;

comparing pairs of said bitonal copies, the copies in each pair corresponding to adjacent contrast sensitivities when said corresponding distinct contrast sensitivities are arranged to form a monotonic sequence and providing a numerical measure of the change between the copies in each pair, whereby the collection of said numerical measures defines a numerical image-variation sequence representing variations in said digital image as the contrast sensitivity thereof is monotonically varied;

deriving from said numerical image-variation sequence and said corresponding distinct contrast sensitivities a first optimizing contrast sensitivity; and providing a bitonal digital copy of said digital image at said first optimizing contrast sensitivity.

2. A method of processing a digital image of a document to provide a digital copy having a selected image quality, the digital image comprising an array of pixels representing at least a portion of said document, comprising the steps of:

deriving from said digital image at least three bitonal copies thereof at corresponding distinct contrast sensitivities;

comparing pairs of said bitonal copies, the copies in each pair corresponding to adjacent contrast sensitivities when said corresponding distinct contrast sensitivities are arranged to form a monotonic sequence and providing a numerical measure of the change between the copies in each pair, whereby the collection of said numerical measures defines a numerical image-variation sequence representing variations in said digital image as the contrast sensitivity thereof is monotonically varied;

detecting in said numerical image-variation sequence a first substantial dropoff as said contrast sensitivity decreases;

defining a first optimizing contrast sensitivity at or beyond said first substantial dropoff; and providing a bitonal digital copy of said digital image at said first optimizing contrast sensitivity.

3. The method of claim 2 wherein said step of defining said first optimizing contrast sensitivity comprises the substeps of:

extrapolating said first substantial dropoff to define a zero-crossing contrast sensitivity at which said first substantial dropoff goes to zero; and defining said first optimizing contrast sensitivity at or beyond said zero-crossing contrast sensitivity.

4. The method of claim 3 wherein said step of defining said first optimizing contrast sensitivity comprises the substeps of:

providing a numerical measure of a first total effective area under said numerical image-variation sequence from said zero-crossing contrast sensitivity to a first-significant-minimum contrast sensitivity corresponding to a first significant minimum of said numerical image-variation sequence; and defining said first optimizing contrast sensitivity to be a first intermediate contrast sensitivity for which the effective area under said numerical image-variation sequence from said zero-crossing contrast sensitivity to said first intermediate contrast sensitivity is a predetermined fraction of said first total effective area.

5. The method of claim 4 further comprising the steps of:

providing a numerical measure of a second total effective area under said numerical image-variation sequence from said first-minimum contrast sensitivity to a second-minimum contrast sensitivity corresponding to a second minimum of said numerical image-variation sequence; and defining a second optimizing contrast sensitivity to be a second intermediate contrast sensitivity for which the effective area under said numerical image-variation sequence from said first-minimum contrast sensitivity to said second intermediate contrast sensitivity is a predetermined fraction of said second total effective area.

6. The method of claim 3 wherein said step of defining said first optimizing contrast sensitivity comprises the sub-steps of:

providing a numerical measure of the total effective area under said numerical image-variation sequence from said zero-crossing contrast sensitivity to the end of said numerical image-variation sequence; and defining said first optimizing contrast sensitivity to be a first intermediate contrast sensitivity for which the effective area under said numerical image-variation sequence from said zero-crossing contrast sensitivity to said first intermediate contrast sensitivity is a first predetermined fraction of said total effective area.

7. The method of claim 2 wherein said step of defining said first optimizing contrast sensitivity comprises the sub-steps of:

providing a numerical measure of the total effective area under said numerical image-variation sequence from the beginning to the end thereof; and defining said first optimizing contrast sensitivity to be a first intermediate contrast sensitivity for which the effective area under said numerical image-variation sequence from the beginning thereof to said first intermediate contrast sensitivity is a predetermined fraction of said total effective area.

* * * * *